(12) United States Patent
Jimichi et al.

(10) Patent No.: US 11,290,019 B2
(45) Date of Patent: Mar. 29, 2022

(54) POWER CONVERTER

(71) Applicant: Mitsubishi Electric Corporation, Chiyoda-ku (JP)

(72) Inventors: Takushi Jimichi, Chiyoda-ku (JP); Nils Soltau, Aachen (DE); Murat Kaymak, Aachen (DE); Rik W. De Doncker, Aachen (DE)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 172 days.

(21) Appl. No.: 16/757,643

(22) PCT Filed: Jul. 5, 2018

(86) PCT No.: PCT/JP2018/025504
§ 371 (c)(1),
(2) Date: Apr. 20, 2020

(87) PCT Pub. No.: WO2019/087466
PCT Pub. Date: May 9, 2019

(65) Prior Publication Data
US 2020/0295665 A1    Sep. 17, 2020

(30) Foreign Application Priority Data

Nov. 1, 2017 (JP) .............................. JP2017-212111

(51) Int. Cl.
*H02M 3/335* (2006.01)
*H01F 27/24* (2006.01)
*H01F 27/28* (2006.01)

(52) U.S. Cl.
CPC ........ *H02M 3/33576* (2013.01); *H01F 27/24* (2013.01); *H01F 27/28* (2013.01)

(58) Field of Classification Search
CPC .......... H02M 3/33576; H02M 1/0048; H02M 1/0077; H01F 27/24; H01F 27/28
See application file for complete search history.

(56) References Cited

U.S. PATENT DOCUMENTS

| 5,027,264 A * | 6/1991 | DeDoncker ....... H02M 3/33584 |
| | | 363/129 |
| 10,361,023 B2 * | 7/2019 | Dally ..................... H01F 38/14 |

(Continued)

FOREIGN PATENT DOCUMENTS

| JP | 58-63725 U | 4/1983 |
| JP | 60-145600 U | 9/1985 |

(Continued)

OTHER PUBLICATIONS

Japanese Office Action drafted on Oct. 7, 2019 in Japanese Patent Application No. 2019-520912 (with unedited computer-generated English translation), 27 pages.

(Continued)

*Primary Examiner* — Adolf D Berhane
*Assistant Examiner* — Afework S Demisse
(74) *Attorney, Agent, or Firm* — Xsensus LLP

(57) ABSTRACT

A transformer includes a first core, a first primary coil, a first secondary coil, and a first insulating member. The first secondary coil includes a second conductor wound around the first core. The first insulating member covers the first secondary coil. The second conductor has a shape of a first polygon in a cross-section of the second conductor. A first corner of the first polygon has a first radius of curvature of 0.1 mm or more. The transformer thus has improved dielectric breakdown voltage and improved power efficiency.

16 Claims, 18 Drawing Sheets

(56) References Cited

U.S. PATENT DOCUMENTS

2012/0280776 A1 11/2012 Hashimoto et al.
2019/0058409 A1 2/2019 Ishibashi et al.

FOREIGN PATENT DOCUMENTS

| JP | 62-193103 A | 8/1987 |
| JP | 10-163045 A | 6/1998 |
| JP | 2004-119811 A | 4/2004 |
| JP | 2009-64941 A | 3/2009 |
| JP | 2010-55965 A | 3/2010 |
| JP | 2012-217319 A | 11/2012 |
| JP | 2017-117920 A | 6/2017 |
| WO | WO 2011/08533 A1 | 7/2011 |
| WO | WO 2017/163508 A1 | 9/2017 |

OTHER PUBLICATIONS

Japanese Office Action drafted on Feb. 21, 2020 in Japanese Patent Application No. 2019-520912 (with unedited computer-generated English translation), 9 pages.
Japanese Office Action drafted on Feb. 21, 2020 in Japanese Patent Application No. 2019-520912 (with unedited computer-generated English translation), 2 pages.
International Search Report dated Oct. 2, 2018 in PCT/JP2018/025504 filed on Jul. 5, 2018, 3 pages.

* cited by examiner

POWER CONVERTER

TECHNICAL FIELD

The present invention relates to a transformer and a power converter.

BACKGROUND ART

U.S. Pat. No. 5,027,264 (PTL 1) discloses a DC/DC transformer including a transformer.

CITATION LIST

Patent Literature

PTL 1: U.S. Pat. No. 5,027,264

SUMMARY OF INVENTION

Technical Problem

An object of the present invention is to provide a transformer and a power converter that have improved dielectric breakdown voltage and improved power efficiency.

Solution to Problem

A transformer according to the present invention includes a first core, a first primary coil, a first secondary coil, and a first insulating member. The first primary coil includes a first conductor wound around the first core. The first secondary coil includes a second conductor wound around the first core. The first insulating member covers the first secondary coil. The first secondary coil is applied with a high voltage compared with the first primary coil. The second conductor has a shape of a first polygon in a first cross-section of the second conductor perpendicular to a direction in which the second conductor extends. A first corner of the first polygon has a first radius of curvature of 0.1 mm or more.

A power converter of the present invention includes the transformer.

Advantageous Effects of Invention

Since the first corner has the first radius of curvature of 0.1 mm, an increase in electric field strength, which results from the concentration of electric field at the first corner, can be restrained. Consequently, a dielectric breakdown of the first insulating member, which results from the concentration of electric field at the first corner, can be restrained. Also, the first secondary primary coil can be miniaturized, leading to miniaturization of the first core. The transformer of the present invention and the power converter of the present invention have improved dielectric breakdown voltage and improved power efficiency.

DESCRIPTION OF EMBODIMENTS

Figure 1:
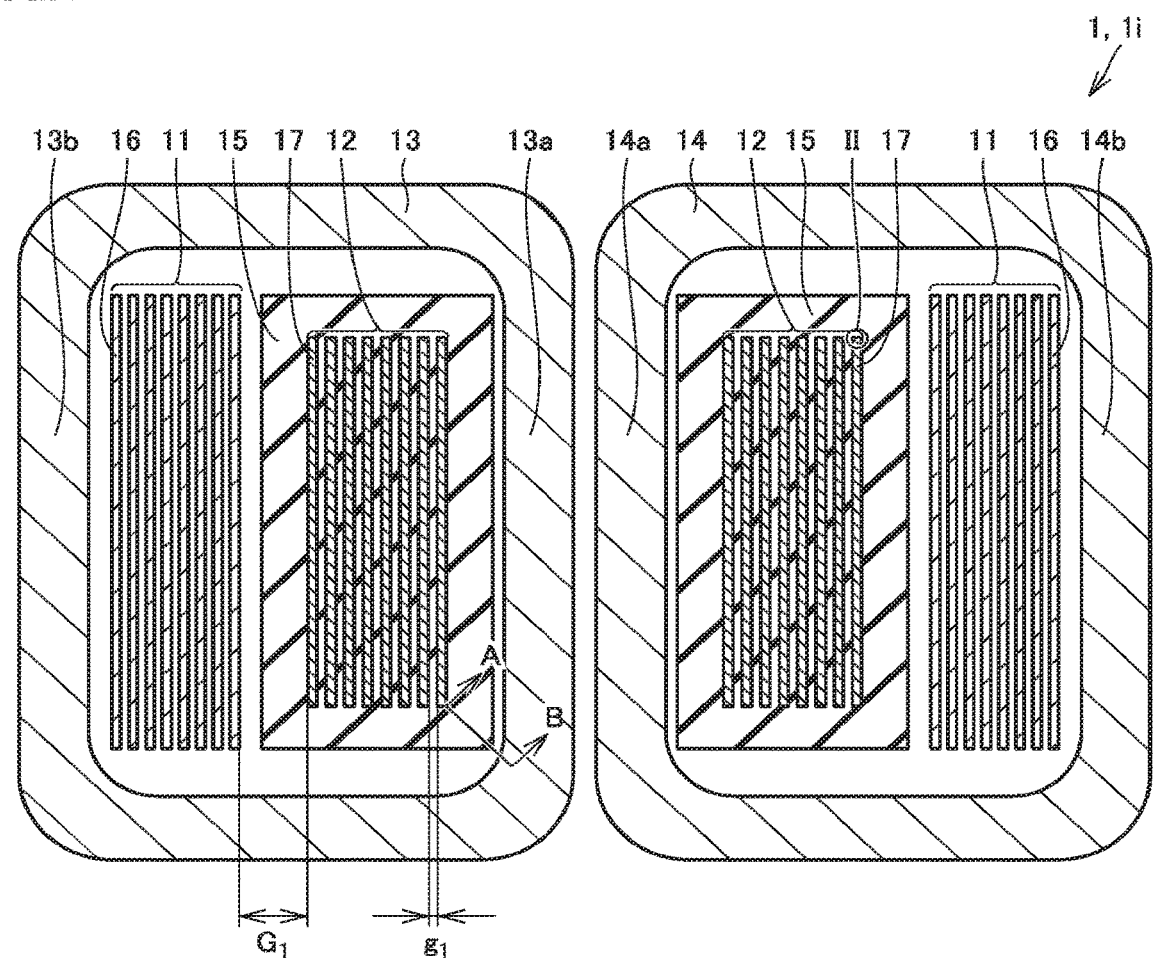
FIG. 1 is a schematic sectional view of a transformer according to each of Embodiment 1 and Embodiment 6.

Embodiments of the present invention will now be described. The same or corresponding components are denoted by the same reference numerals, description of which will not be repeated.

Embodiment 1

A transformer 1 according to Embodiment 1 will be described with reference to FIGS. 1 and 2. Transformer 1 includes a first core 13, a first primary coil 11, a first secondary coil 12, and a first insulating member 15. In the present embodiment, transformer 1 may further include a second core 14 and may be a shell-type transformer. Transformer 1 may be a core-type transformer.

First core 13 may include a first leg 13a and a second leg 13b opposed to first leg 13a. First core 13 may be a first ring core. First core 13 may be formed of a magnetic material having a low power loss, such as first amorphous magnetic material or first nanocrystalline magnetic material. The first nanocrystalline magnetic material may be, for example, an iron-based nanocrystalline magnetic material or a cobalt-based nanocrystalline magnetic material. The first amorphous magnetic material may be, for example, an iron-based amorphous magnetic material or a cobalt-based amorphous magnetic material. Even when the frequency of the power supplied to transformer 1 and the frequency of the power output from transformer 1 increase, the first amorphous magnetic material or the first nanocrystalline magnetic material included in first core 13 can reduce a power loss in first core 13.

Second core 14 may include a third leg 14a facing first leg 13a and a fourth leg 14b opposed to third leg 14a. Second core 14 may be a second ring core. Second core 14 may be formed of a magnetic material having a low power loss, such as second amorphous magnetic material or second nanocrystalline magnetic material. The second nanocrystalline magnetic material may be, for example, an iron-based nanocrystalline magnetic material or a cobalt-based nanocrystalline magnetic material. The second amorphous magnetic material may be, for example, an iron-based amorphous magnetic material or a cobalt-based amorphous magnetic material. Even when the frequency of the power supplied to transformer 1 and the frequency of the power output from transformer 1 increase, the second amorphous magnetic material or the second nanocrystalline magnetic material included in second core 14 can reduce a power loss in second core 14. The material for second core 14 may be identical to or different from the material for first core 13.

First primary coil 11 includes a first conductor 16 wound around first core 13. First conductor 16 is wound around first leg 13a. First conductor 16 may be wound around second core 14. First conductor 16 may be wound around third leg 14a. First conductor 16 may be a conductive foil. Herein, the conductive foil refers to a conductor having a width larger than its thickness. In first conductor 16 formed of the conductive foil, a power loss in first primary coil 11 which results from the skin effect and the proximity effect in first primary coil 11, can be reduced.

First secondary coil 12 includes a second conductor 17 wound around first core 13. Second conductor 17 is wound around first leg 13a. Second conductor 17 may be wound around second core 14. Second conductor 17 may be wound around third leg 14a. First secondary coil 12 may be disposed inside first primary coil 11. First secondary coil 12 may be disposed between first primary coil 11 and first leg 13a and between first primary coil 11 and third leg 14a. Second conductor 17 may be a first conductive foil. In second conductor 17 formed of the first conductive foil, a power loss in first secondary coil 12, which results from the skin effect and the proximity effect in first secondary coil 12, can be reduced.

First secondary coil 12 is configured to be applied with a high voltage compared with first primary coil 11. A voltage of 25 kV or more may be applied to first secondary coil 12. Since a low voltage is applied to first primary coil 11 compared with first secondary coil 12, first primary coil 11 may not be covered with an insulating member. Since first primary coil 11 is not covered with an insulating member, first core 13 and second core 14 can be miniaturized.

Figure 2:
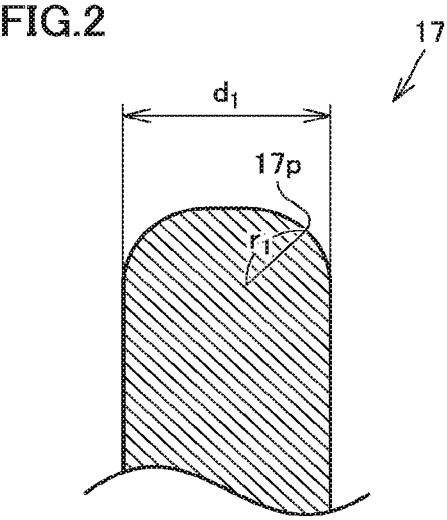
FIG. 2 is a partially enlarged schematic sectional view of a region II, shown in FIG. 1, of the transformer according to each of Embodiment 1 and Embodiment 6.

As shown in FIG. 2, second conductor 17 has the shape of a first polygon in a first cross-section of second conductor 17 perpendicular to the direction in which second conductor 17 extends. Herein, the polygon includes a polygon with a corner having a curvature. A first corner 17p of the first polygon has a first radius of curvature $r_1$ of 0.1 mm or more. First radius of curvature $r_1$ is equal to or less than a half of a first thickness $d_1$ of second conductor 17. Second conductor 17 with first corner 17p having first radius of curvature $r_1$ may be formed by processing second conductor 17 with a die.

As shown in FIG. 1, first insulating member 15 covers first secondary coil 12. First insulating member 15 may seal first secondary coil 12. First secondary coil 12 may be molded with first insulating member 15. First insulating member 15 may be formed of a resin material, such as epoxy resin or polyurethane resin.

Figure 3:
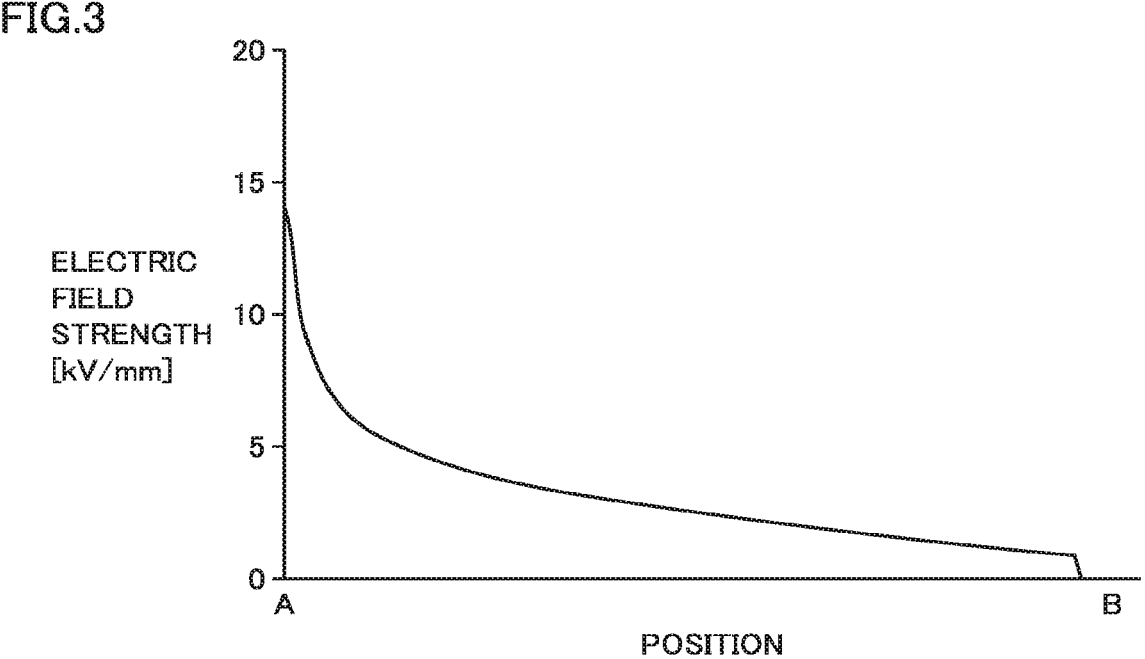
FIG. 3 shows a distribution of an electric field strength in A-B, shown in FIG. 1, of a transformer of an example of Embodiment 1.

FIG. 3 shows a distribution of an electric field strength in a region, which is indicated by line A-B in FIG. 1, in transformer 1 of one example of Embodiment 1. In one example of the present embodiment, a voltage of 25 kV is applied to first secondary coil 12, first corner 17p has first radius of curvature $r_1$ of 0.1 mm, and first insulating member 15 is formed of the epoxy resin. The epoxy resin has a dielectric breakdown voltage of 15 kV/mm. In one example of the present embodiment, a maximum value of the electric field strength around first secondary coil 12 is less than the electric field strength (15 kV/mm) that causes a dielectric breakdown in first insulating member 15. Since first corner 17p has first radius of curvature $r_1$ of 0.1 mm, an increase in the electric field strength in first insulating member 15, which results from the concentration of electric field at first corner 17p, can be restrained, which can prevent a dielectric breakdown of first insulating member 15.

In one example of the present embodiment, a minimum distance between first secondary coil 12 and first core 13 is 6 mm or more in the region in which the electric field strength between first secondary coil 12 and first core 13 becomes maximum. When the distance between first secondary coil 12 and first core 13 is constant around first secondary coil 12, the region in which the electric field strength between first secondary coil 12 and first core 13 becomes maximum is the region indicated by line A-B in FIG. 1.

Figure 4:
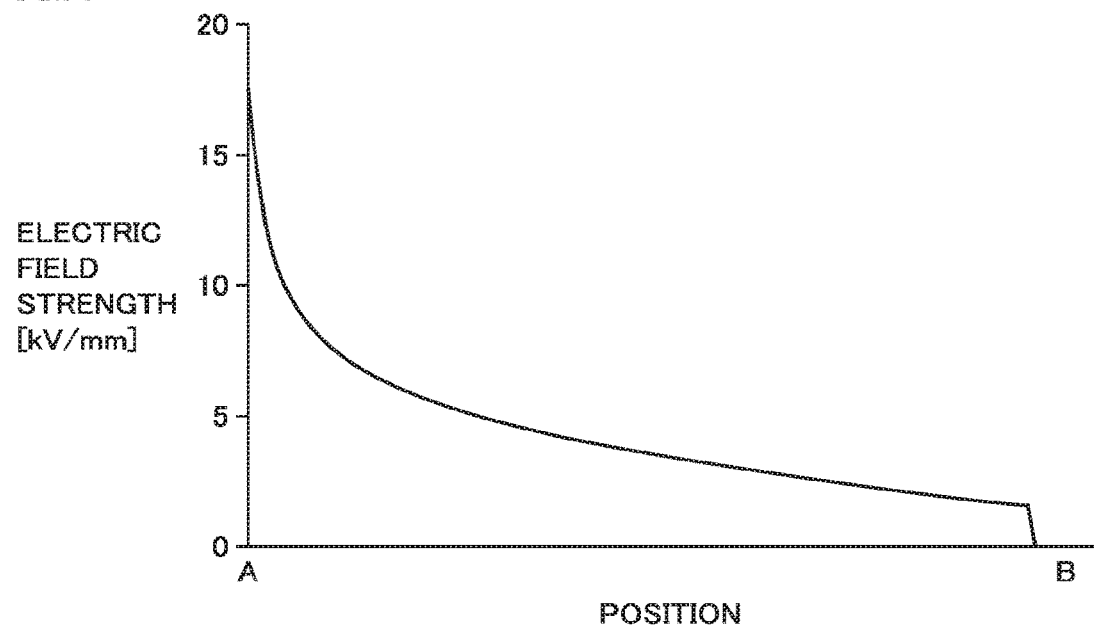
FIG. 4 shows a distribution of an electric field strength in A-B of a transformer according to a comparative example.

FIG. 4 shows a distribution of an electric field strength in a region indicated by line A-B in a transformer according to a comparative example. In the comparative example, first corner 17p has an angle of 90°. In the comparative example, the maximum value of the electric field strength around first secondary coil 12 is greater than an electric field strength (15 kV/mm) that causes a dielectric breakdown in first insulating member 15. In the comparative example, since first corner 17p has an angle of 90°, a dielectric breakdown of first insulating member 15, which results from the concentration of electric field at first corner 17p, may occur.

As described above, in transformer 1, the strength of an electric field applied to first insulating member 15 covering first secondary coil 12 can be reduced. A gap $g_1$ between adjacent portions of second conductor 17 can be reduced, leading to miniaturization of first secondary coil 12. Thus, first core 13 and second core 14 can be miniaturized, reducing a power loss in first core 13 and second core 14. Transformer 1 of the present embodiment has improved power efficiency. The power efficiency herein refers to a ratio of the power output from a transformer to the power supplied to the transformer.

It is generally difficult to increase the size of a core formed of an amorphous magnetic material or a nanocrystalline magnetic material. In transformer 1 of the present embodiment, first core 13 and second core 14 can be miniaturized. Thus, the material for first core 13 can be a magnetic material having a low power loss, such as first amorphous magnetic material or first nanocrystalline magnetic material. The material for second core 14 can be a magnetic material having a low power loss, such as second amorphous magnetic material or second nanocrystalline magnetic material.

Figure 5:
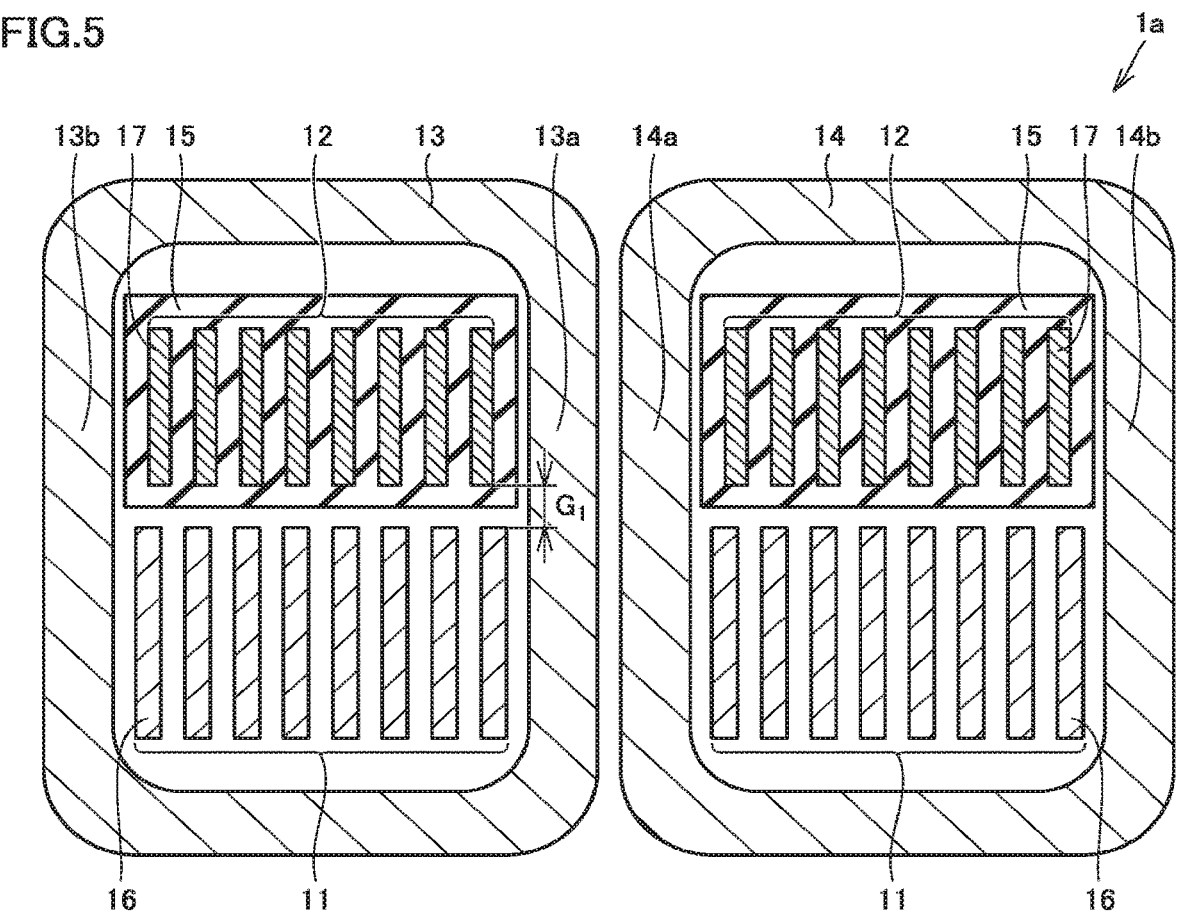
FIG. 5 is a schematic sectional view of a transformer according to a modification of Embodiment 1.

As shown in FIG. 5, in a transformer 1*a* of a modification of the present embodiment, first primary coil 11 and first secondary coil 12 may be arranged in the direction in which first leg 13*a* and third leg 14*a* extend. Transformer 1*a* can have a relatively large gap $G_1$ between first primary coil 11 and first secondary coil 12 compared with transformer 1. Transformer 1*a* can have weak magnetic coupling between first primary coil 11 and first secondary coil 12 compared with transformer 1. Transformer 1*a* thus has a relatively high leakage inductance compared with transformer 1.

A power converter 25 according to Embodiment 1 will be described with reference to FIGS. 6 and 7. Power converter 25 can be used in an offshore wind power generator or a DC power grid. Power converter 25 mainly includes a plurality of DC/DC converters 30. Power converter 25 may further include primary DC terminals 27*a*, 27*b* and secondary DC terminals 28*a*, 28*b*.

DC/DC converters 30 each include primary terminals 31*a*, 31*b*, a DC/AC conversion circuit 33 connected to primary terminals 31*a*, 31*b*, transformer 1 (or transformer 1*a*), an AC/DC conversion circuit 34, and secondary terminals 32*a*, 32*b* connected to AC/DC conversion circuit 34. DC/DC converters 30 may each further include a first capacitor 38 connected in parallel with primary terminals 31*a*, 31*b* and a second capacitor 39 connected in parallel with secondary terminals 32*a*, 32*b*.

Figure 7:
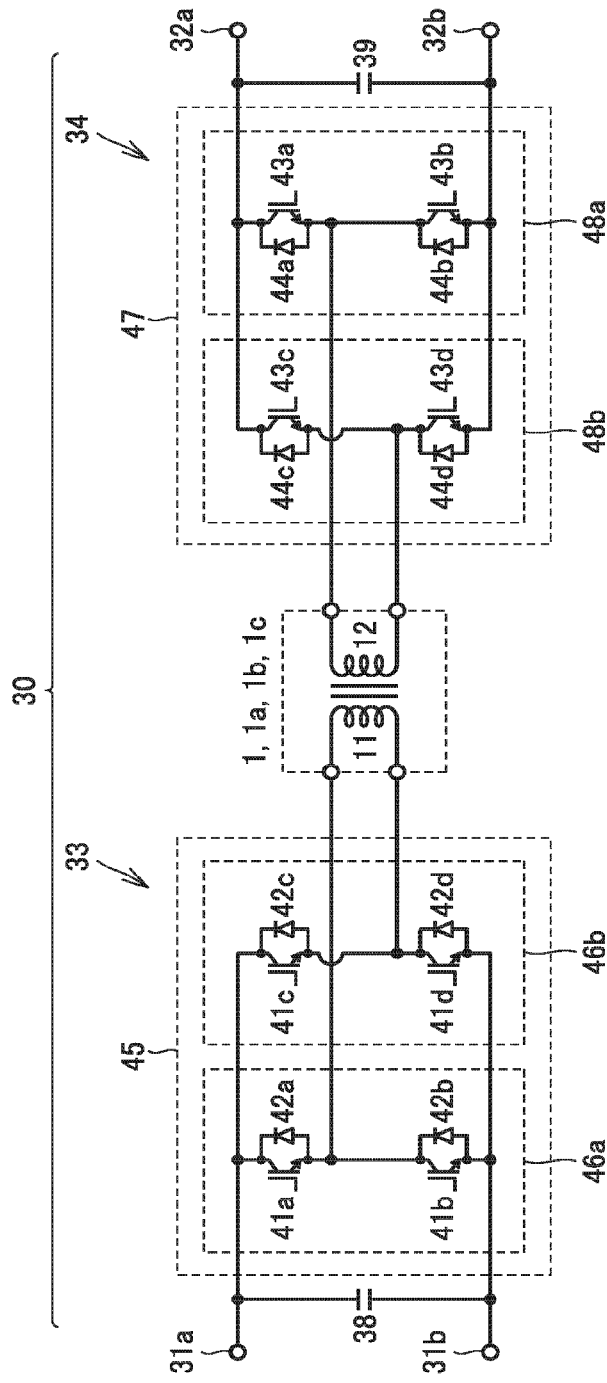
FIG. 7 is a partially enlarged circuit diagram of the power converter according to each of Embodiment 1 and Embodiment 2.

As shown in FIG. 7, DC/AC conversion circuit 33 is connected to first primary coil 11 and is a first single-phase bridge circuit. DC/AC conversion circuit 33 may be a first single-phase full-bridge circuit. DC/AC conversion circuit 33 may include a first switching circuit 45.

First switching circuit 45 includes a plurality of first switching elements 41*a*, 41*b*, 41*c*, 41*d* and a plurality of first diodes 42*a*, 42*b*, 42*c*, 42*d* connected in anti-parallel with first switching elements 41*a*, 41*b*, 41*c*, 41*d*, respectively. First switching elements 41*a*, 41*b*, 41*c*, 41*d* may be transistors, such as insulated gate bipolar transistors (IGBTs).

First switching circuit 45 includes two first legs 46*a*, 46*b* connected in parallel with each other. First leg 46*a* includes two first switching elements 41*a*, 41*b* connected in series with each other and two first diodes 42*a*, 42*b* connected in anti-parallel with two first switching elements 41*a*, 41*b*, respectively. First leg 46*b* includes two first switching elements 41*c*, 41*d* connected in series with each other and two first diodes 42*c*, 42*d* connected in anti-parallel with two first switching elements 41*c*, 41*d*, respectively.

The opposite terminals (DC terminals) of each of two first legs 46*a*, 46*b* are connected to first capacitor 38. The midpoint (AC terminal) of each of two first legs 46*a*, 46*b* is connected to first primary coil 11 (first conductor 16) of transformer 1, 1*a*. The midpoint (AC terminal) of first leg 46*a* is located between first switching elements 41*a*, 41*b*. The midpoint (AC terminal) of first leg 46*b* is located between first switching elements 41*c*, 41*d*.

AC/DC conversion circuit 34 is connected to first secondary coil 12 and is a second single-phase bridge circuit. AC/DC conversion circuit 34 may be a second single-phase full-bridge circuit. AC/DC conversion circuit 34 may include a second switching circuit 47.

Second switching circuit 47 includes a plurality of second switching elements 43*a*, 43*b*, 43*c*, 43*d* and a plurality of second diodes 44*a*, 44*b*, 44*c*, 44*d* connected in anti-parallel with second switching elements 43*a*, 43*b*, 43*c*, 43*d*, respectively. Second switching elements 43*a*, 43*b*, 43*c*, 43*d* may be transistors, such as insulated gate bipolar transistors (IGBTs).

Second switching circuit 47 includes two second legs 48*a*, 48*b* connected in parallel with each other. Second leg 48*a* includes two second switching elements 43*a*, 43*b* connected in series with each other and two second diodes 44*a*, 44*b* connected in anti-parallel with two second switching elements 43*a*, 43*b*, respectively. Second leg 48*b* includes two second switching elements 43*c*, 43*d* connected in series with each other and two second diodes 44*c*, 44*d* connected in anti-parallel with two second switching elements 43*c*, 43*d*, respectively.

The opposite terminals (DC terminals) of each of two second legs 48*a*, 48*b* are connected to second capacitor 39. The midpoint (AC terminal) of each of two second legs 48*a*, 48*b* is connected to a first secondary coil 12 (second conductor 17) of transformer 1, 1*a*. The midpoint (AC terminal) of second leg 48*a* is located between second switching elements 43*a*, 43*b*. The midpoint (AC terminal) of second leg 48*b* is located between second switching elements 43*c*, 43*d*.

First switching elements 41*a*, 41*b*, 41*c*, 41*d* and second switching elements 43*a*, 43*b*, 43*c*, 43*d* may be configured to operate at frequencies of 100 Hz or more, may be configured to operate at frequencies of 200 Hz or more, or may be configured to operate at frequencies of 1 kHz or more. First switching elements 41*a*, 41*b*, 41*c*, 41*d* and second switching elements 43*a*, 43*b*, 43*c*, 43*d* may be configured to operate at frequencies of 2 kHz or less. Since first switching elements 41*a*, 41*b*, 41*c*, 41*d* and second switching elements 43*a*, 43*b*, 43*c*, 43*d* are configured to operate at high frequencies, each of DC/DC converters 30 can be miniaturized.

As first switching elements 41*a*, 41*b*, 41*c*, 41*d* and second switching elements 43*a*, 43*b*, 43*c*, 43*d* are operated at frequencies of, for example, 1 kHz or more, first core 13 and second core 14 can be miniaturized. Thus, the material for first core 13*a* can be a magnetic material having a low power loss, such as first amorphous magnetic material or first nanocrystalline magnetic material. The material for second core 14A can be a magnetic material having a low power loss, such as second amorphous magnetic material or second nanocrystalline magnetic material.

Figure 6:
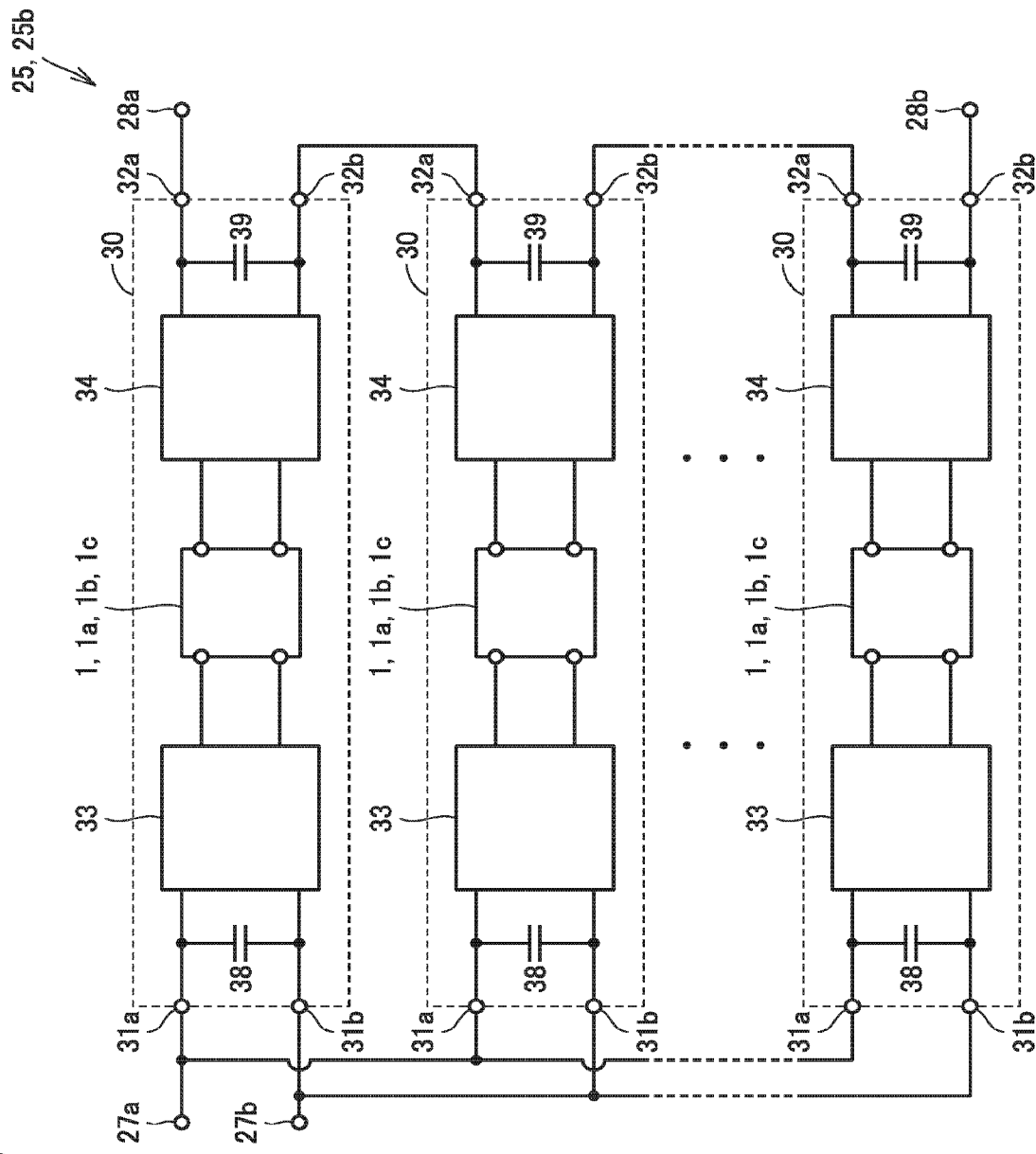
FIG. 6 is a circuit diagram of a power converter according to each of Embodiment 1 and Embodiment 2.

As shown in FIG. 6, DC/DC converters 30 are connected to primary DC terminals 27*a*, 27*b* and secondary DC terminals 28*a*, 28*b*. Primary terminals 31*a*, 31*b* of DC/DC converters 30 are connected to primary DC terminals 27*a*, 27*b*. Primary terminals 31*a*, 31*b* of DC/DC converters 30 are connected in parallel with each other. Power converter 25 can thus handle high-current power. Secondary terminals 32*a*, 32*b* of DC/DC converters 30 are connected to secondary DC terminals 28*a*, 28*b*. Secondary terminals 32*a*, 32*b* of DC/DC converters 30 are connected in series with each other. Thus, power converter 25 can handle high-voltage power. Power converter 25 can convert low-voltage DC power of 1 kV to 3 kV into high-voltage DC power of 25 kV or more.

The effects of transformer 1, 1*a* and power converter 25 of the present embodiment will be described.

Transformer 1, 1*a* of the present embodiment includes first core 13, first primary coil 11, first secondary coil 12, and first insulating member 15. First primary coil 11 includes first conductor 16 wound around first core 13. First secondary coil 12 includes second conductor 17 wound around first core 13. First insulating member 15 covers first secondary coil 12. First secondary coil 12 is configured to be applied with a high voltage compared with first primary coil 11. Second conductor 17 has a shape of a first polygon in the first cross-section of second conductor 17 perpendicular to the direction in which second conductor 17 extends. First corner 17p of the first polygon has first radius of curvature $r_1$ of 0.1 mm or more.

Since first corner 17p has first radius of curvature $r_1$ of 0.1 mm, an increase in the electric field strength in first insulating member 15, which results from the concentration of electric field at first corner 17p, can be restrained. Thus, the dielectric breakdown of first insulating member 15 can be prevented. Transformer 1, 1a of the present embodiment has improved dielectric breakdown voltage. First secondary coil 12 can be miniaturized. Thus, first core 13 can be miniaturized, reducing a power loss in first core 13. Transformer 1, 1a of the present embodiment has improved power efficiency.

In transformer 1, 1a of the present embodiment, second conductor 17 may be a first conductive foil. This can reduce a power loss in first secondary coil 12 which results from the skin effect and the proximity effect in first secondary coil 12. Transformer 1, 1a of the present embodiment has improved power efficiency.

In transformer 1, 1a of the present embodiment, first core 13 may be formed of the first amorphous magnetic material or the first nanocrystalline magnetic material. Thus, the power loss in first core 13 can be reduced even when the frequency of the power supplied to transformer 1, 1a and the frequency of the power output from transformer 1, 1a increase. Transformer 1, 1a of the present embodiment has improved power efficiency.

Transformer 1, 1a of the present embodiment may further include second core 14. First core 13 may include first leg 13a and second leg 13b opposed to first leg 13a. Second core 14 may include third leg 14a facing first leg 13a and fourth leg 14b opposed to third leg 14a. First conductor 16 may be wound around first leg 13a and third leg 14a. Second conductor 17 may be wound around first leg 13a and third leg 14a. In transformer 1, 1a of the present embodiment, an increase in the electric field strength in first insulating member 15, which results from the concentration of electric field at first corner 17p, can be restrained. Thus, the dielectric breakdown of first insulating member 15 can be prevented. Transformer 1, 1a of the present embodiment has improved dielectric breakdown voltage. Gap $g_1$ between adjacent portions of second conductor 17 can be reduced. Thus, first core 13 and second core 14 can be miniaturized, reducing a power loss in first core 13 and second core 14. Transformer 1, 1a of the present embodiment has improved power efficiency.

In transformer 1 of the present embodiment, first secondary coil 12 may be disposed inside first primary coil 11. Thus, gap $G_1$ between first primary coil 11 and first secondary coil 12 can be reduced relatively. Magnetic coupling between first primary coil 11 and first secondary coil 12 can be increased. Transformer 1 having a relatively low leakage inductance can be provided.

In transformer 1a of the present embodiment, first primary coil 11 and first secondary coil 12 may be arranged in the direction in which first leg 13a and third leg 14a extend. Thus, gap $G_1$ between first primary coil 11 and first secondary coil 12 can be increased relatively. Magnetic coupling between first primary coil 11 and first secondary coil 12 can be weakened. Transformer 1a having a relatively high leakage inductance can be provided.

In transformer 1, 1a of the present embodiment, second core 14 may be formed of the second amorphous magnetic material or the second nanocrystalline magnetic material. Thus, the power loss in second core 14 can be reduced even when the frequency of the power supplied to transformer 1, 1a and the frequency of the power output from transformer 1, 1a increase. Transformer 1, 1a of the present embodiment has improved power efficiency.

Power converter 25 of the present embodiment includes DC/DC converters 30. DC/DC converters 30 each include primary terminals 31a, 31b, DC/AC conversion circuit 33 connected to primary terminals 31a, 31b, AC/DC conversion circuit 34, and secondary terminals 32a, 32b connected to AC/DC conversion circuit 34. DC/AC conversion circuit 33 is connected to first primary coil 11 and is a first single-phase bridge circuit. AC/DC conversion circuit 34 is connected to first secondary coil 12 and is a second single-phase bridge circuit. Primary terminals 31a, 31b of DC/DC converters 30 are connected in parallel with each other. Secondary terminals 32a, 32b of DC/DC converters 30 are connected in series with each other. Power converter 25 of the present embodiment has improved dielectric breakdown voltage and improved power efficiency.

Embodiment 2

A transformer 1b according to Embodiment 2 will be described with reference to FIGS. 8 and 9. Although transformer 1b of the present embodiment includes components similar to the components of transformer 1 of Embodiment 1, it differs from that of Embodiment 1 mainly in the following respects.

In transformer 1b of the present embodiment, second conductor 18 is a first litz wire formed of a plurality of twisted first conductive strands 19. First conductive strands 19 each have the shape of a circle having a first radius $R_1$ of 0.1 mm or more in the first cross-section of second conductor 18. Herein, the circle shapes include not only the shape of a circle but also the shape of an oval in which a ratio of its major axis to its mirror axis is 1.0 or more and 1.5 or less, and first radius $R_1$ of 0.1 mm or more refers to a minor axis of 0.1 mm or more. Thus, second conductor 18 has a first corner 18p having first radius of curvature $r_1$ defined by first radius $R_1$ of first conductive strand 19.

Figure 8:
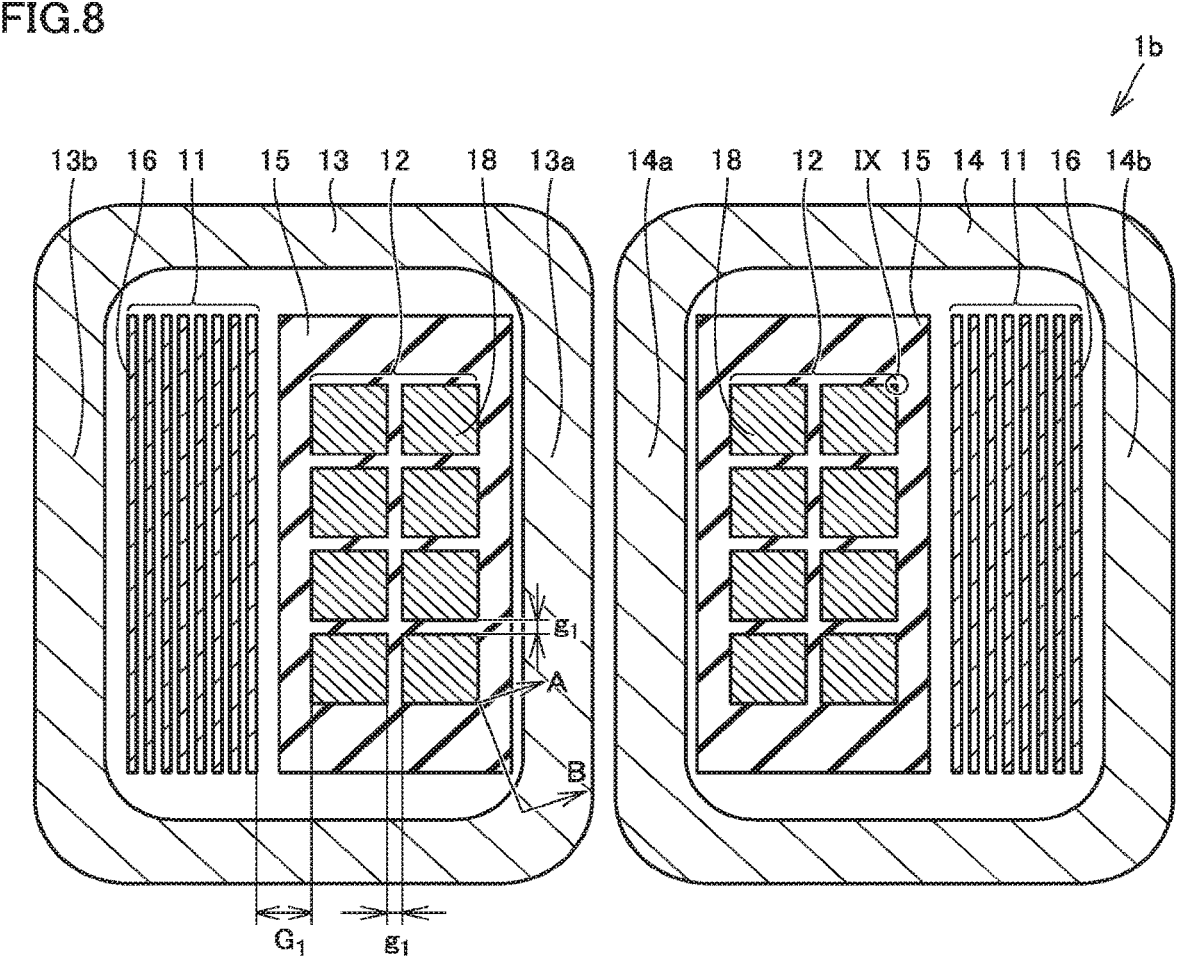
FIG. 8 is a schematic sectional view of a transformer according to Embodiment 2.
Figure 9:
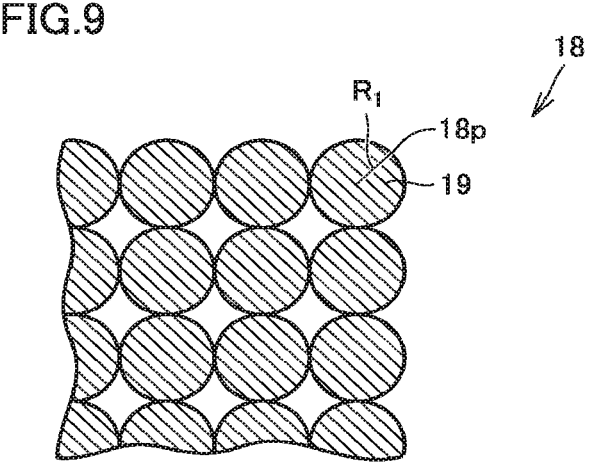
FIG. 9 is a partially enlarged schematic sectional view of a region IX, shown in FIG. 8, of the transformer according to Embodiment 2.
Figure 10:
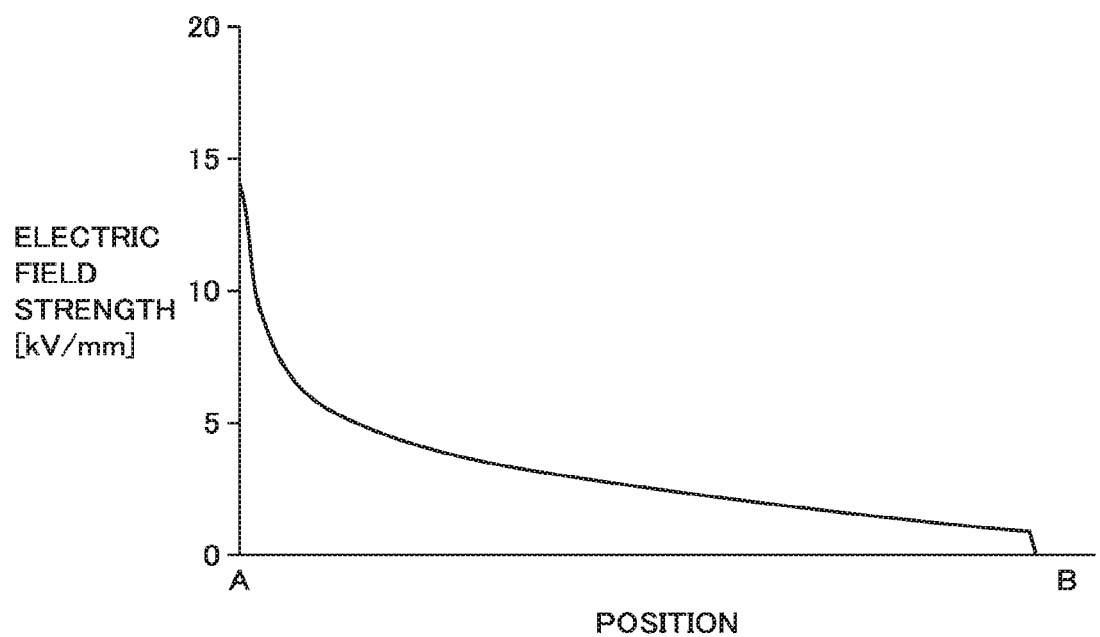
FIG. 10 shows a distribution of an electric field strength in A-B, shown in FIG. 8, of a transformer of an example of Embodiment 2.

FIG. 10 shows a distribution of an electric field strength of the region indicated by line A-B in FIG. 8 in transformer 1b of one example of Embodiment 2. In one example of the present embodiment, a maximum value of the electric field strength around first secondary coil 12 is less than the electric field strength (15 kV/mm) that causes a dielectric breakdown in first insulating member 15. Since first conductive strands 19 each have the shape of a circle having first radius $R_1$ of 0.1 mm or more, an increase in the electric field strength in first insulating member 15, which results from the concentration of electric field at first corner 18p, can be restrained, thus preventing a dielectric breakdown of first insulating member 15. Further, it is not necessary to process second conductor 18 in the present embodiment, unlike in Embodiment 1. Transformer 1b of the present embodiment can thus be manufactured at low cost compared with transformer 1 of Embodiment 1.

Figure 11:
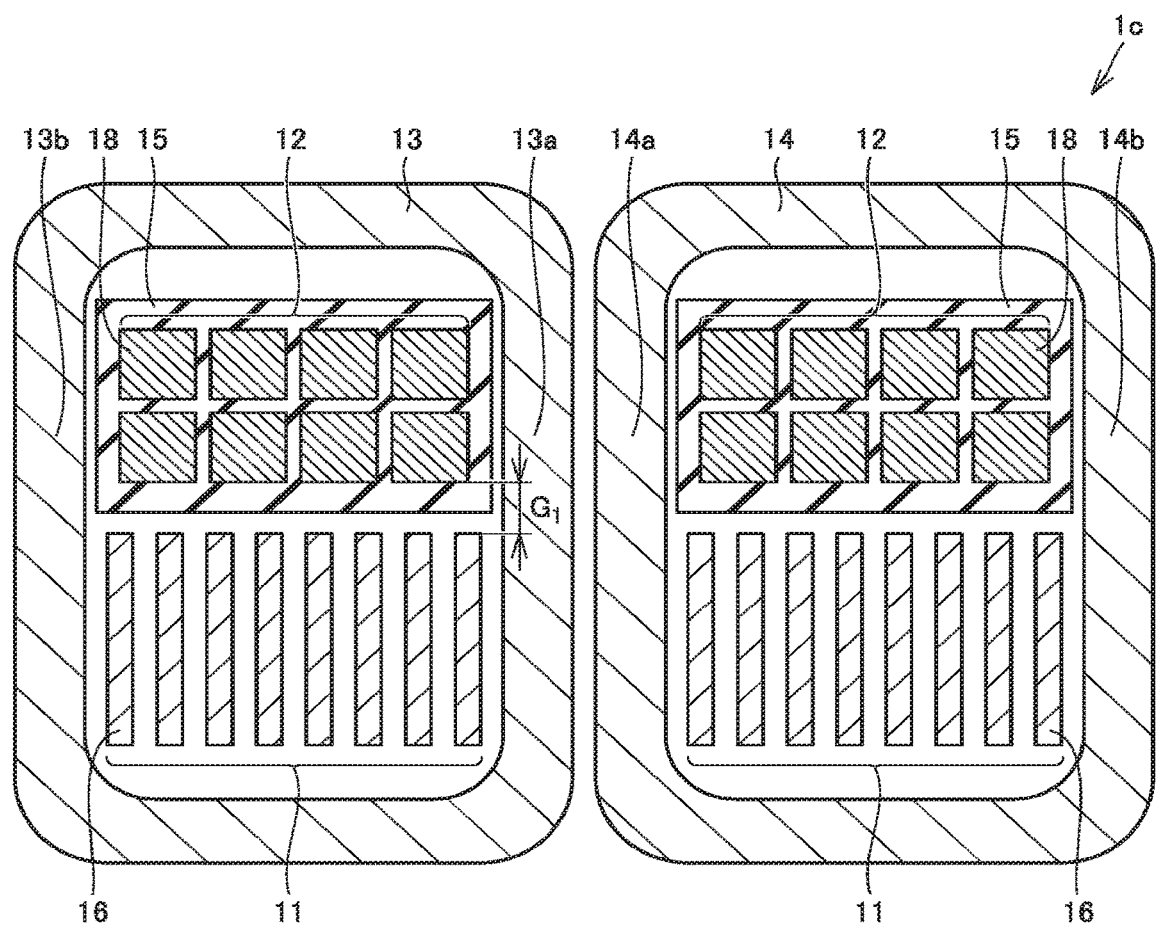
FIG. 11 is a schematic sectional view of a transformer according to a modification of Embodiment 2.

As shown in FIG. 11, in a transformer 1c of a modification of the present embodiment, first primary coil 11 and first secondary coil 12 may be arranged in the direction in which first leg 13a and third leg 14a extend. In transformer 1c, gap $G_1$ between first primary coil 11 and first secondary coil 12 can be relatively large compared with transformer 1b. In transformer 1c, magnetic coupling between first primary coil 11 and first secondary coil 12 can be weak compared with transformer 1b. Thus, transformer 1c has a relatively high leakage inductance compared with transformer 1b.

A power converter 25b according to Embodiment 2 will be described with reference to FIGS. 6 and 7. Although power converter 25b of the present embodiment includes components similar to the components of power converter 25 of Embodiment 1, it differs from that of Embodiment 1 in that transformer 1, 1a of Embodiment 1 is replaced by transformer 1b, 1c of the present embodiment.

The effects of transformer 1b, 1c and power converter 25b of the present embodiment will be described. Transformer 1b, 1c and power converter 25b of the present embodiment achieve the following effects similar to the components of transformer 1, 1a and power converter 25 of Embodiment 1.

In transformer 1b, 1c and power converter 25b of the present embodiment, second conductor 18 is a first litz wire formed of twisted first conductive strands 19. First conductive strands 19 each have the shape of a circle having first radius $R_1$ of 0.1 mm or more in the first cross-section of second conductor 18. Thus, an increase in the electric field strength in first insulating member 15, which results from the concentration of electric field at first corner 18p of second conductor 18, can be restrained. Transformer 1b, 1c and power converter 25b of the present embodiment have improved dielectric breakdown voltage and improved power efficiency.

Embodiment 3

A power converter 25d according to Embodiment 3 will be described with reference to FIGS. 12 to 14. Although power converter 25d of the present embodiment includes components similar to the components of power converter 25 of Embodiment 1, it differs from that of Embodiment 1 mainly in the following respects.

Power converter 25d of the present embodiment includes a plurality of DC/DC converters 30d. As shown in FIGS. 12 and 13, DC/DC converters 30d each include primary terminals 31a, 31b, a DC/AC conversion circuit 33d connected to primary terminals 31a, 31b, a transformation unit 40, an AC/DC conversion circuit 34d, and secondary terminals 32a, 32b connected to AC/DC conversion circuit 34d.

Figure 12:
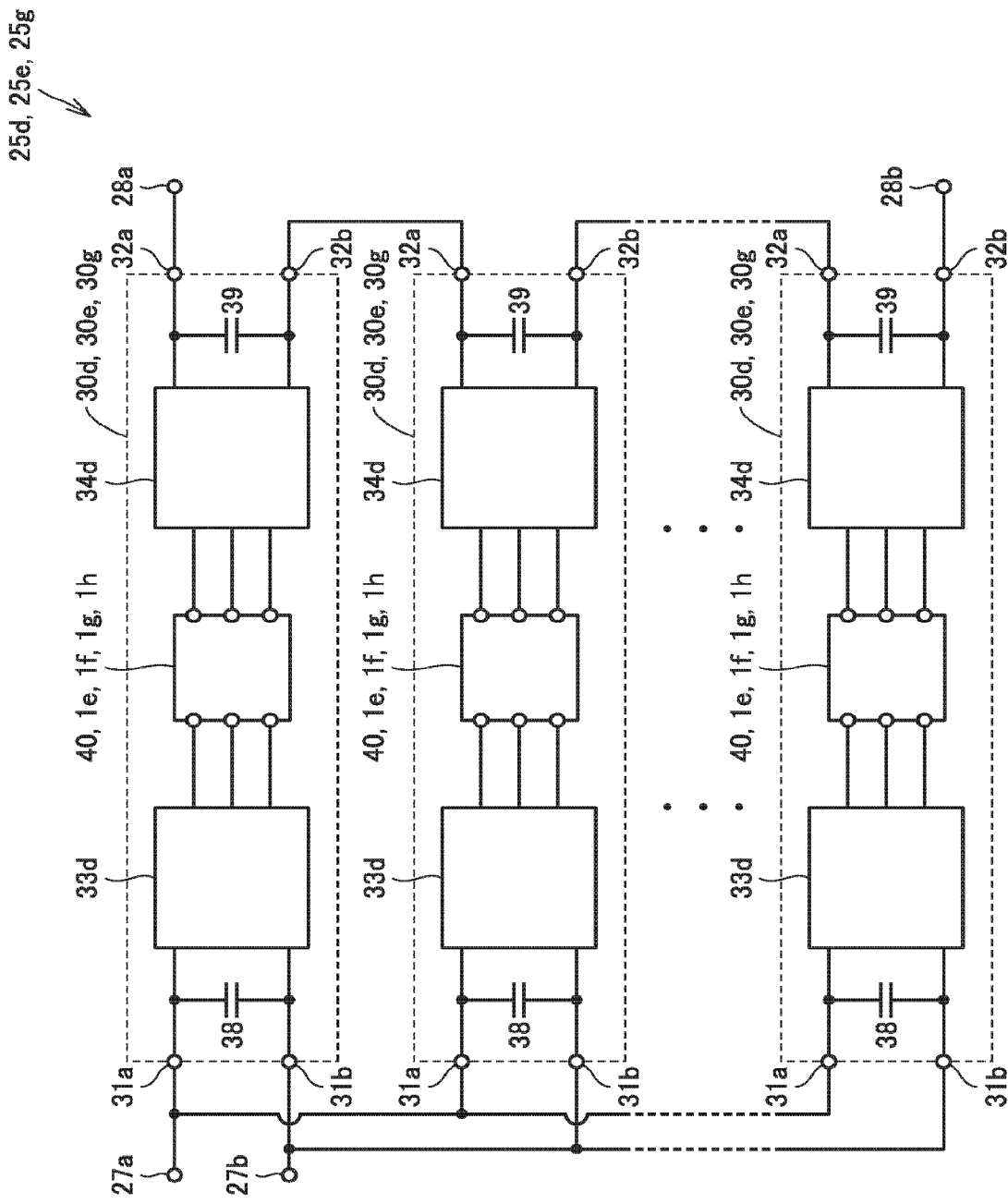
FIG. 12 is a circuit diagram of power converters according to Embodiment 3 to Embodiment 5.
Figure 13:
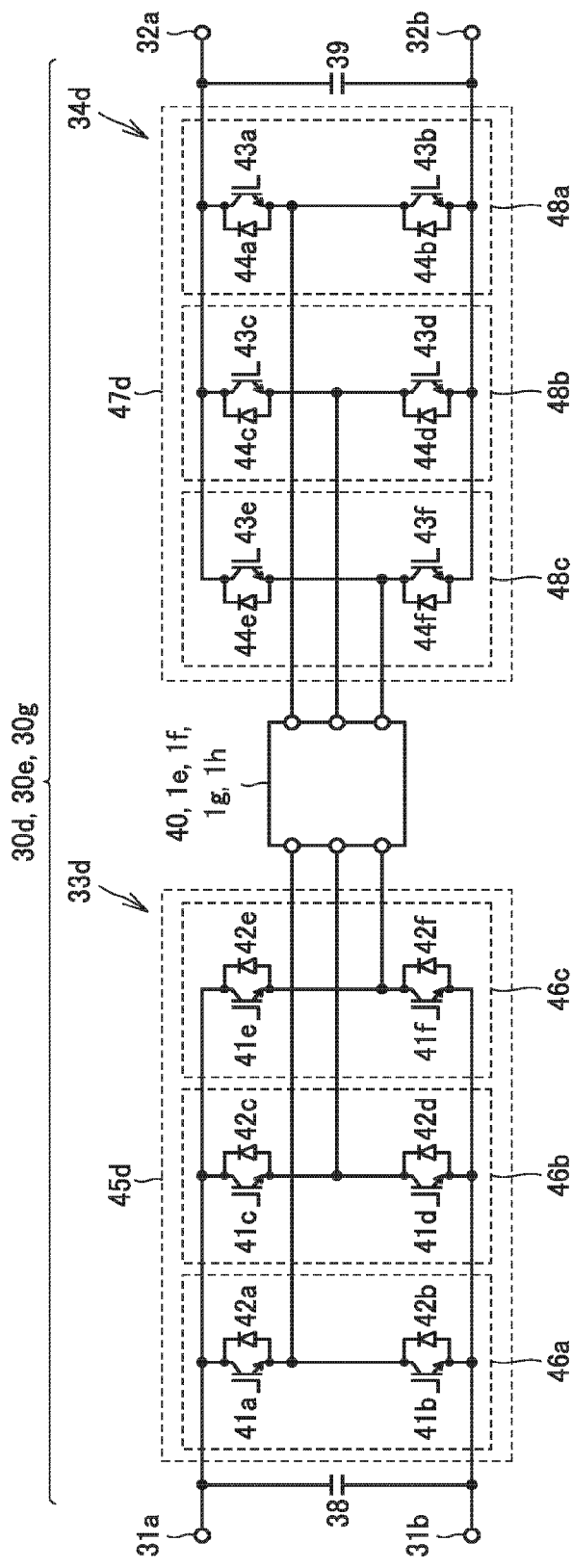
FIG. 13 is a partially enlarged circuit diagram of the power converter according to Embodiment 3.
Figure 14:
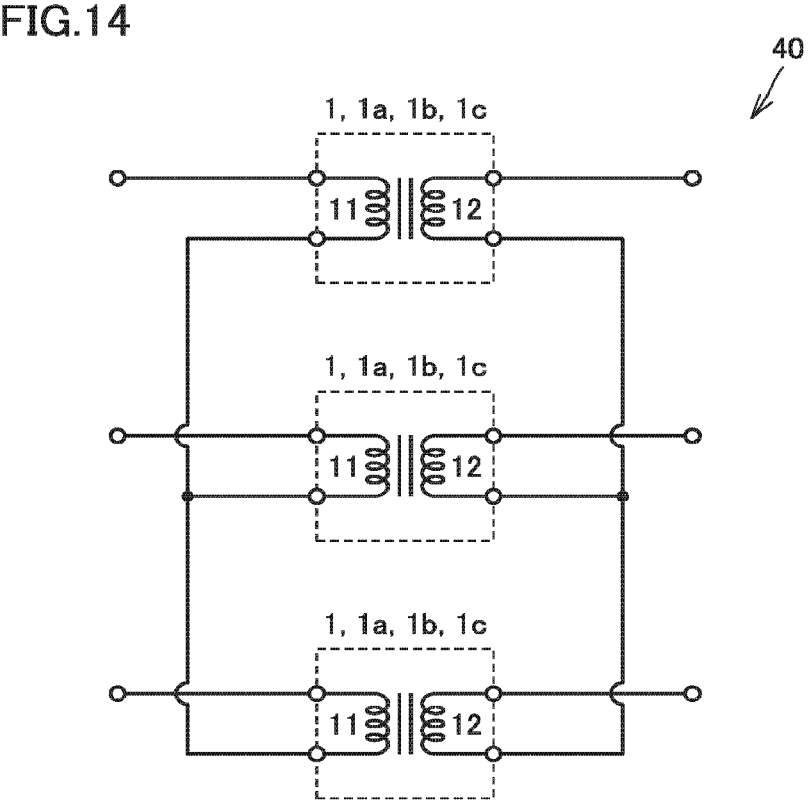
FIG. 14 is a partially enlarged circuit diagram of the power converter according to Embodiment 3.

As shown in FIGS. 12 to 14, transformation unit 40 includes any three of transformers 1, 1a, 1b, 1c of Embodiment 1 and Embodiment 2. DC/AC conversion circuits 33d are connected to first primary coils 11 of transformation units 40 (three transformers 1, 1a, 1b, 1c). Specifically, first terminals of first primary coils 11 of three transformers 1, 1a, 1b, 1c are connected to DC/AC conversion circuits 33d. Second terminals of first primary coils 11 of three transformers 1, 1a, 1b, 1c are connected to each other. DC/AC conversion circuit 33d is a first three-phase bridge circuit. DC/AC conversion circuit 33d may be a first three-phase full-bridge circuit. DC/AC conversion circuit 33d may include a first switching circuit 45d.

As shown in FIG. 13, first switching circuit 45d includes a plurality of first switching elements 41a, 41b, 41c, 41d, 41e, 41f and a plurality of first diodes 42a, 42b, 42c, 42d, 42e, 42f connected in anti-parallel with first switching elements 41a, 41b, 41c, 41d, 41e, 41f, respectively. First switching elements 41a, 41b, 41c, 41d, 41e, 41f may be transistors, such as insulated gate bipolar transistors (IGBTs).

First switching circuit 45d includes three first legs 46a, 46b, 46c connected in parallel with each other. First leg 46a includes two first switching elements 41a, 41b connected in series with each other and two first diodes 42a, 42b connected in anti-parallel with two first switching elements 41a, 41b, respectively. First leg 46b includes two first switching elements 41c, 41d connected in series with each other and two first diodes 42c, 42d connected in anti-parallel with two first switching elements 41c, 41d, respectively. First leg 46c includes two first switching elements 41e, 41f connected in series with each other and two first diodes 42e, 42f connected in anti-parallel with two first switching elements 41e, 41f, respectively.

The opposite terminals (DC terminals) of each of three first legs 46a, 46b, 46c are connected to first capacitor 38. The midpoint (AC terminal) of each of three first legs 46a, 46b, 46c is connected to a corresponding one of three first primary coils 11 (first conductors 16) of three transformers 1, 1a, 1b, 1c. The midpoint (AC terminal) of first leg 46a is located between two first switching elements 41a, 41b. The midpoint (AC terminal) of first leg 46b is located between two first switching elements 41c, 41d. The midpoint (AC terminal) of first leg 46c is located between two first switching elements 41e, 41f.

As shown in FIGS. 12 to 14, AC/DC conversion circuits 34d are connected to first secondary coils 12 of transformation units 40 (three transformers 1, 1a, 1b, 1c). Specifically, first terminals of first secondary coils 12 of three transformers 1, 1a, 1b, 1c are connected to AC/DC conversion circuit 34d. Second terminals of first secondary coils 12 of three transformers 1, 1a, 1b, 1c are connected to each other. AC/DC conversion circuit 34d is a second three-phase bridge circuit. AC/DC conversion circuit 34d may be a second three-phase full-bridge circuit. AC/DC conversion circuit 34d may include second switching circuit 47d.

As shown in FIG. 13, second switching circuit 47d includes a plurality of second switching elements 43a, 43b, 43c, 43d, 43e, 43f and a plurality of second diodes 44a, 44b, 44c, 44d, 44e, 44f connected in anti-parallel with second switching elements 43a, 43b, 43c, 43d, 43e, 43f, respectively. Second switching elements 43a, 43b, 43c, 43d, 43e, 43f may be transistors, such as insulated gate bipolar transistors (IGBTs).

Second switching circuit 47d includes three second legs 48a, 48b, 48c connected in parallel with each other. Second leg 48a includes two second switching elements 43a, 43b connected in series with each other and two second diodes 44a, 44b connected in anti-parallel with two second switching elements 43a, 43b, respectively. Second leg 48b includes two second switching elements 43c, 43d connected in series with each other and two second diodes 44c, 44d connected in anti-parallel with two second switching elements 43c, 43d, respectively. Second leg 48c includes two second switching elements 43e, 43f connected in series with each other and two second diodes 44e, 44f connected in anti-parallel with two second switching elements 43e, 43f, respectively.

The opposite terminals (DC terminals) of each of three second legs 48a, 48b, 48c are connected to second capacitor 39. Each of the midpoints (AC terminals) of three second legs 48a, 48b, 48c is connected to a corresponding one of three first secondary coils 12 (second conductors 17) of three transformers 1, 1a, 1b, 1c. The midpoint (AC terminal) of second leg 48a is located between two second switching elements 43a, 43b. The midpoint (AC terminal) of second leg 48b is located between two second switching elements 43c, 43d. The midpoint (AC terminal) of second leg 48c is located between two second switching elements 43e, 43f.

First switching elements 41a, 41b, 41c, 41d, 41e, 41f and second switching elements 43a, 43b, 43c, 43d, 43e, 43f may be configured to operate at frequencies of 100 Hz or more, may be configured to operate at frequencies of 200 Hz or more, or may be configured to operate at frequencies of 1 kHz or more. First switching elements 41a, 41b, 41c, 41d, 41e, 41f and second switching elements 43a, 43b, 43c, 43d, 43e, 43f may be configured to operate at frequencies of 2 kHz of less. Since first switching elements 41a, 41b, 41c, 41d, 41e, 41f and second switching elements 43a, 43b, 43c, 43d, 43e, 43f are configured to operate at high frequencies, each of DC/DC converters 30d can be miniaturized.

As first switching elements 41a, 41b, 41c, 41d, 41e, 41f and second switching elements 43a, 43b, 43c, 43d, 43e, 43f are operated at, for example, frequencies of 1 kHz or more, first core 13 and second core 14 can be miniaturized. Thus, the material for first core 13 can be a magnetic material having a low power loss, such as first amorphous magnetic material or first nanocrystalline magnetic material. The material for second core 14 can be a magnetic material having a low power loss, such as second amorphous magnetic material or second nanocrystalline magnetic material.

As shown in FIG. 12, DC/DC converters 30d are connected to primary DC terminals 27a, 27b and secondary DC terminals 28a, 28b. Primary terminals 31a, 31b of DC/DC converters 30d are connected to primary DC terminals 27a, 27b. Primary terminals 31a, 31b of DC/DC converters 30d are connected in parallel with each other. Thus, power converter 25d can handle high-current power. Secondary terminals 32a, 32b of DC/DC converters 30d are connected to secondary DC terminals 28a, 28b. Secondary terminals 32a, 32b of DC/DC converters 30d are connected in series with each other. Thus, power converter 25d can handle high-voltage power. Power converter 25d can convert low-voltage DC power of 1 kV to 3 kV into high-voltage DC power of 25 kV or more.

The effects of power converter 25d of the present embodiment will be described. Power converter 25d of the present embodiment achieves the following effects in addition to the effects of power converter 25 of Embodiment 1.

Power converter 25d of the present embodiment includes DC/DC converters 30d. DC/DC converters 30d each include primary terminals 31a, 31b, DC/AC conversion circuit 33d connected to primary terminals 31a, 31b, transformation unit 40, AC/DC conversion circuit 34d, and secondary terminals 32a, 32b connected to AC/DC conversion circuit 34d. Transformation unit 40 includes any three of transformers 1, 1a, 1b, 1c of Embodiment 1 and Embodiment 2. Each of DC/AC conversion circuits 33d is connected to a corresponding one of first primary coils 11 of three transformers 1, 1a, 1b, 1c and is a first three-phase bridge circuit. Each of AC/DC conversion circuits 34d is connected to a corresponding one of first secondary coils 12 of three transformers 1, 1a, 1b, 1c and is a second three-phase bridge circuit. Primary terminals 31a, 31b of DC/DC converters 30d are connected in parallel with each other. Secondary terminals 32a, 32b of DC/DC converters 30d are connected in series with each other. Power converter 25d of the present embodiment has improved dielectric breakdown voltage and improved power efficiency.

Since power converter 25d of the present embodiment is a three-phase power converter, a current flowing through transformer 1, 1a, 1b, 1c can be reduced. Thus, the power loss in first switching elements 41a, 41b, 41c, 41d, 41e, 41f and second switching elements 43a, 43b, 43c, 43d, 43e, 43f and the power loss in first primary coil 11 and first secondary coil 12 can be reduced. Further, since the capacity of each of three transformers 1, 1a, 1b, 1c can be reduced, first core 13 and second core 14 can be miniaturized. Thus, the material for first core 13 can be a magnetic material having a low power loss, such as first amorphous magnetic material or first nanocrystalline magnetic material. The material for second core 14 can be a magnetic material having a low power loss, such as second amorphous magnetic material or second nanocrystalline magnetic material. Power converter 25d of the present embodiment has improved power efficiency.

Embodiment 4

Figure 15:
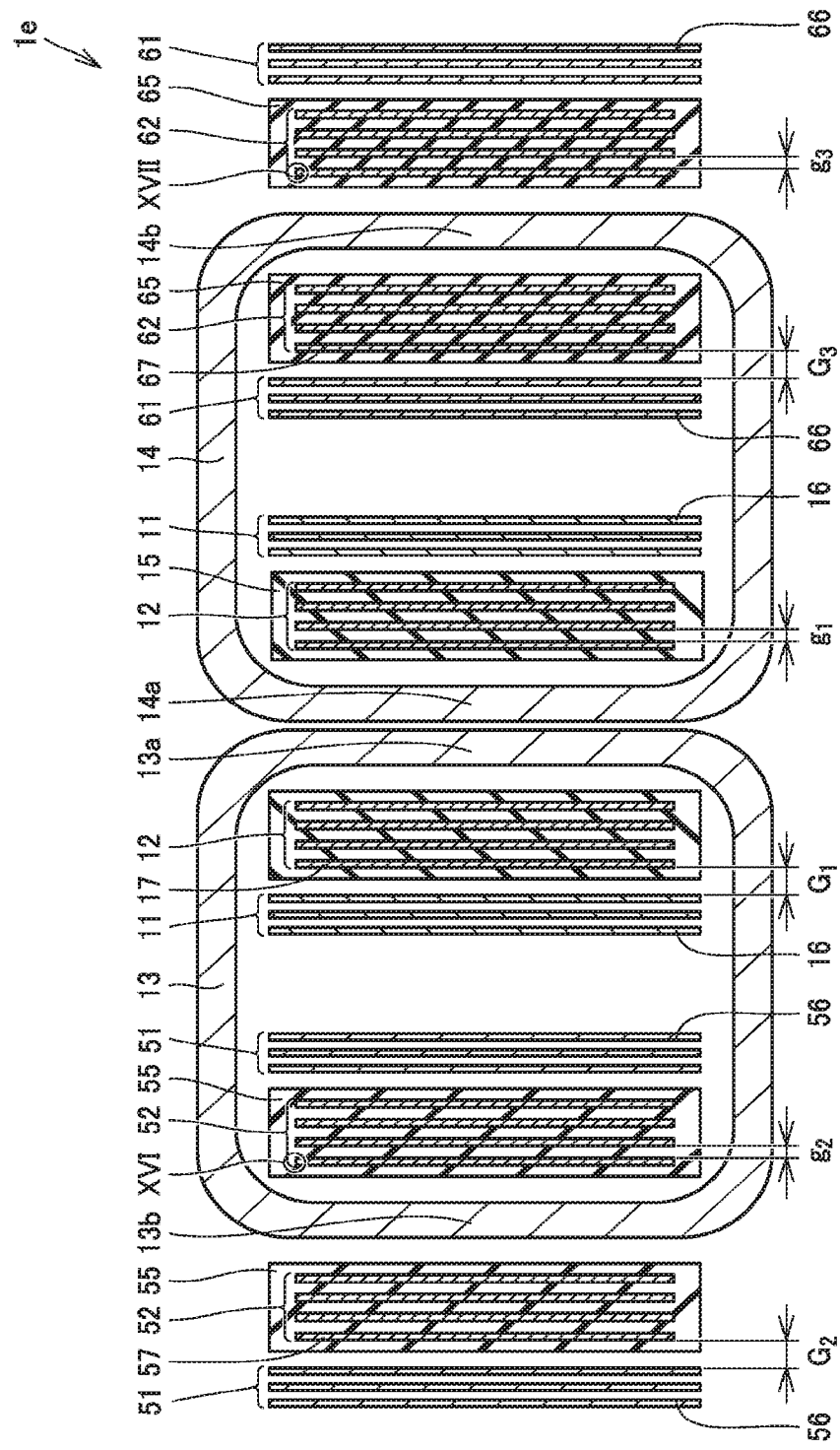
FIG. 15 is a schematic sectional view of the transformer according to Embodiment 4.

A transformer 1e according to Embodiment 4 will be described with reference to FIGS. 15 to 17. Although transformer 1e of the present embodiment includes components similar to the components of transformer 1 of Embodiment 1, it differs from that of Embodiment 1 mainly in the following respects. Transformer 1e of the present embodiment further includes a second primary coil 51, a second secondary coil 52, a second insulating member 55, a third primary coil 61, a third secondary coil 62, and a third insulating member 65.

Second primary coil 51 includes a third conductor 56 wound around first core 13. Third conductor 56 is wound around second leg 13b. Third conductor 56 may be a conductive foil. In third conductor 56 formed of the conductive foil, a power loss in second primary coil 51, which results from the skin effect and the proximity effect in second primary coil 51, can be reduced.

Second secondary coil 52 includes a fourth conductor 57 wound around first core 13. Fourth conductor 57 is wound around second leg 13b. Second secondary coil 52 may be disposed inside second primary coil 51. Second secondary coil 52 may be disposed between second primary coil 51 and second leg 13b. Fourth conductor 57 may be a second conductive foil. In fourth conductor 57 formed of the second conductive foil, a power loss in second secondary coil 52, which results from the skin effect and the proximity effect in second secondary coil 52, can be reduced.

Second secondary coil 52 is configured to be applied with a high voltage compared with second primary coil 51. A voltage of 25 kV or more may be applied to second secondary coil 52. Since a low voltage is applied to second primary coil 51 compared with second secondary coil 52, second primary coil 51 may not be covered with an insulating member. Since second primary coil 51 is not covered with the insulating member, first core 13 can be miniaturized.

Figure 16:
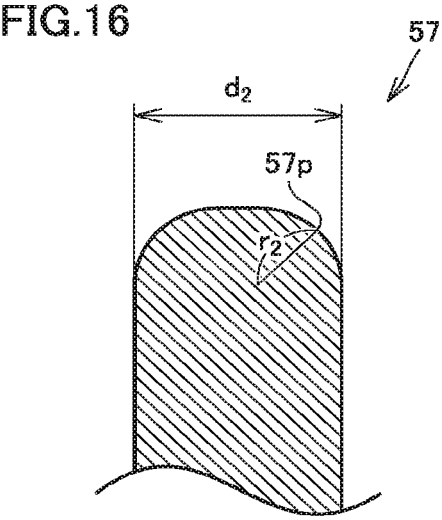
FIG. 16 is a partially enlarged schematic sectional view of a region XVI, shown in FIG. 15, of the transformer according to Embodiment 4.

As shown in FIG. 16, fourth conductor 57 has the shape of a second polygon in a second cross-section of fourth conductor 57 perpendicular to the direction in which fourth conductor 57 extends. A second corner 57p of the second polygon has a second radius of curvature $r_2$ of 0.1 mm or more. This can restrain an increase in the electric field strength, which results from the concentration of electric field at second corner 57p, thus preventing a dielectric breakdown of second insulating member 55. Second radius of curvature $r_2$ is equal to or less than a half of a thickness $d_2$ of fourth conductor 57. Fourth conductor 57 with second corner 57p having second radius of curvature $r_2$ may be formed by processing fourth conductor 57 with a die. Second radius of curvature $r_2$ may be equal to first radius of curvature $r_1$, may be greater than first radius of curvature $r_1$, or may be smaller than first radius of curvature $r_1$.

Second insulating member 55 covers second secondary coil 52. Second insulating member 55 may seal second secondary coil 52. Second secondary coil 52 may be molded with second insulating member 55. Second insulating member 55 may be formed of a resin material, such as epoxy resin or polyurethane resin.

Third primary coil 61 includes a fifth conductor 66 wound around second core 14. Fifth conductor 66 is wound around fourth leg 14b. Fifth conductor 66 may be a conductive foil. In fifth conductor 66 formed of the conductive foil, a power loss in third primary coil 61, which results from the skin effect and the proximity effect in third primary coil 61, can be reduced.

Third secondary coil 62 includes a sixth conductor 67 wound around second core 14. Sixth conductor 67 is wound around fourth leg 14b. Third secondary coil 62 may be disposed inside third primary coil 61. Third secondary coil 62 may be disposed between third primary coil 61 and fourth leg 14b. Sixth conductor 67 may be a third conductive foil. In sixth conductor 67 formed of the third conductive foil, a power loss in third secondary coil 62, which results from the skin effect and the proximity effect in third secondary coil 62, can be reduced.

Third secondary coil 62 is configured to be applied with a high voltage compared with third primary coil 61. A voltage of 25 kV or more may be applied to third secondary coil 62. Since a low voltage is applied to third primary coil 61 compared with third secondary coil 62, third primary coil 61 may not be covered with the insulating member. Since third primary coil 61 is not covered with the insulating member, second core 14 can be miniaturized.

Figure 17:
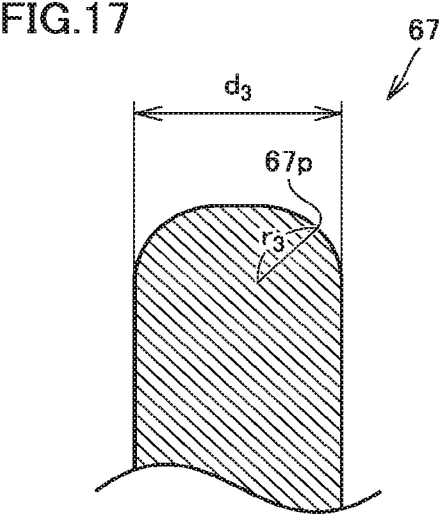
FIG. 17 is a partially enlarged schematic sectional view of a region XVII, shown in FIG. 15, of the transformer according to Embodiment 4.

As shown in FIG. 17, sixth conductor 67 has the shape of a third polygon in a third cross-section of sixth conductor 67 perpendicular to the direction in which sixth conductor 67 extends. A third corner 67p of the third polygon has a third radius of curvature $r_3$ of 0.1 mm or more. Thus, an increase in the electric field strength, which results from the concentration of electric field at third corner 67p, can be reduced, thus preventing a dielectric breakdown of third insulating member 65. Third radius of curvature $r_3$ is equal to or less than a half of a thickness $d_3$ of sixth conductor 67. Sixth conductor 67 with third corner 67p having third radius of curvature $r_3$ may be formed by processing sixth conductor 67 with a die. Third radius of curvature $r_3$ may be equal to first radius of curvature $r_1$, may be greater than first radius of curvature $r_1$, or may be smaller than first radius of curvature $r_1$. Third radius of curvature $r_3$ may be equal to second radius of curvature $r_2$, may be greater than second radius of curvature $r_2$, or may be smaller than second radius of curvature $r_2$.

Third insulating member 65 covers third secondary coil 62. Third insulating member 65 may seal third secondary coil 62. Third secondary coil 62 may be molded with third insulating member 65. Third insulating member 65 may be formed of a resin material, such as epoxy resin or polyurethane resin.

In transformer 1e, the strength of an electric field applied to second insulating member 55 covering second secondary coil 52 can be reduced. A gap $g_2$ between adjacent portions of fourth conductor 57 can be reduced, leading to miniaturization of second secondary coil 52. Thus, first core 13 can be miniaturized, reducing a power loss in first core 13. Transformer 1e has improved power efficiency. It is generally difficult to increase the size of a core formed of an amorphous magnetic material or a nanocrystalline magnetic material. Since first core 13 can be miniaturized in transformer 1e, the material for first core 13 can be a magnetic material having a low power loss, such as first amorphous magnetic material or first nanocrystalline magnetic material.

In transformer 1e, the strength of an electric field applied to third insulating member 65 covering third secondary coil 62 can be reduced. A gap $g_3$ between adjacent portions of sixth conductor 67 can be reduced, leading to miniaturization of third secondary coil 62. Thus, second core 14 can be miniaturized, reducing a power loss in second core 14. Transformer 1e has improved power efficiency. It is generally difficult to increase the size of a core formed of an amorphous magnetic material or a nanocrystalline magnetic material. Since second core 14 can be miniaturized in transformer 1e, the material for second core 14 can be a magnetic material having a low power loss, such as second amorphous magnetic material or second nanocrystalline magnetic material.

Figure 18:
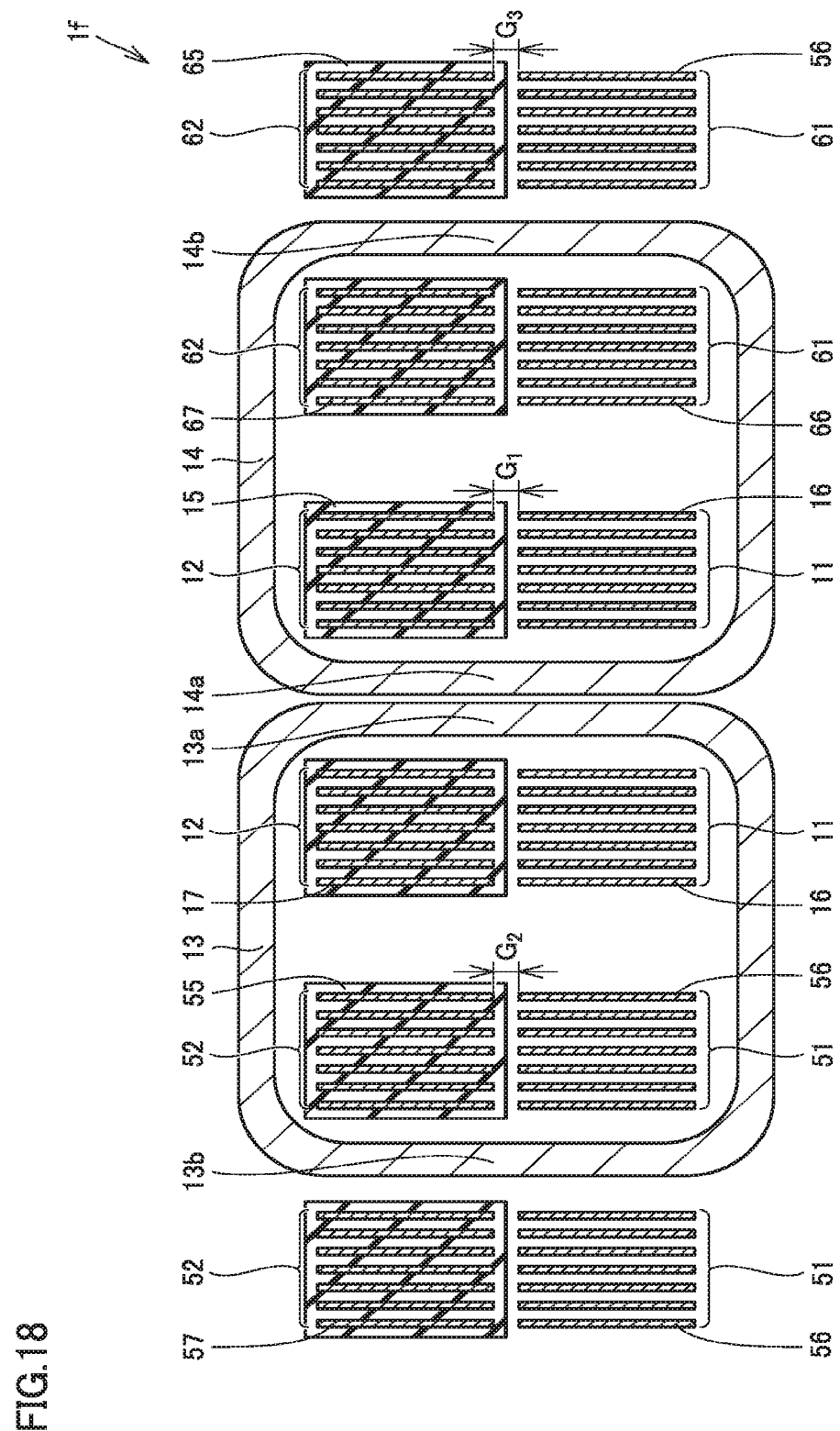
FIG. 18 is a schematic sectional view of a transformer according to a modification of Embodiment 4.

As shown in FIG. 18, in a transformer 1f of a modification of the present embodiment, second primary coil 51 and second secondary coil 52 may be arranged in the direction in which second leg 13b extends. Third primary coil 61 and third secondary coil 62 may be arranged in the direction in which fourth leg 14b extends. In transformer 1f, a gap $G_2$ between second primary coil 51 and second secondary coil 52 can be relatively large compared with transformer 1e. In transformer 1f, a gap $G_3$ between third primary coil 61 and third secondary coil 62 can be relatively large compared with transformer 1e. In transformer 1f, magnetic coupling between second primary coil 51 and second secondary coil 52 can be weak compared with transformer 1e. In transformer 1f, magnetic coupling between third primary coil 61 and third secondary coil 62 can be weak compared with transformer 1e. Transformer 1f has a relatively high leakage inductance compared with transformer 1e.

Figure 19:
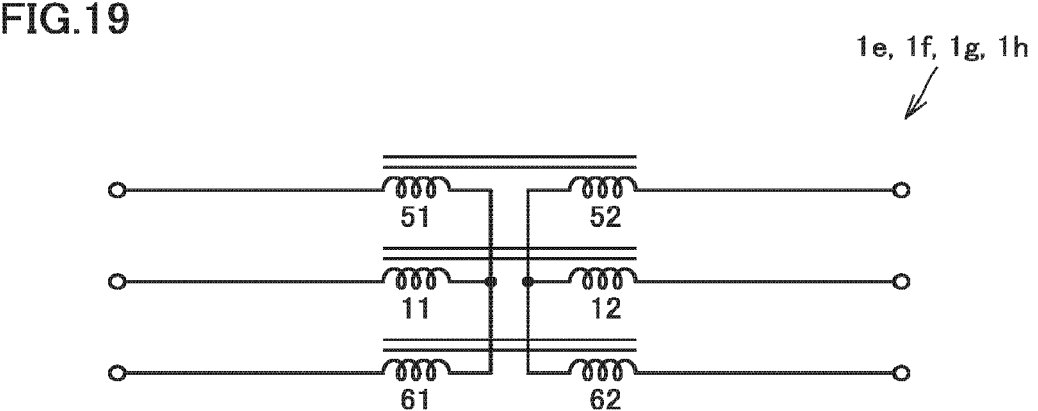
FIG. 19 is a partially enlarged circuit diagram of the power converter according to each of Embodiment 4 and Embodiment 5.

A power converter 25e according to Embodiment 4 will be described with reference to FIGS. 12, 13, and 19. Although power converter 25e of the present embodiment includes components similar to the components of power converter 25d of Embodiment 3, it differs from that of Embodiment 3 mainly in that in power converter 25e of the present embodiment, transformation unit 40 of Embodiment 3 is replaced by transformer 1e or transformer 1f of the present embodiment.

Power converter 25e of the present embodiment includes a plurality of DC/DC converters 30e. Although DC/DC converter 30e of the present embodiment includes components similar to the components of DC/DC converter 30d of Embodiment 3, it differs from that of Embodiment 3 mainly in that transformation unit 40 of Embodiment 3 is replaced by transformer 1e or transformer 1f of the present embodiment. Specifically, DC/DC converters 30e each include primary terminals 31a, 31b, DC/AC conversion circuit 33d connected to primary terminals 31a, 31b, transformer 1e, 1f, AC/DC conversion circuit 34d, and secondary terminals 32a, 32b connected to AC/DC conversion circuit 34d.

DC/AC conversion circuit 33d is connected to first primary coil 11, second primary coil 51, and third primary coil 61 and is a first three-phase bridge circuit. DC/AC conversion circuit 33d may be a first three-phase full-bridge circuit. AC/DC conversion circuit 34d is connected to first secondary coil 12, second secondary coil 52, and third secondary coil 62 and is a second three-phase bridge circuit. AC/DC conversion circuit 34d may be a second three-phase full-bridge circuit.

Primary terminals 31a, 31b of DC/DC converters 30e are connected in parallel with each other. Thus, power converter 25e can handle high-current power. Secondary terminals 32a, 32b of DC/DC converters 30e are connected in series with each other. Thus, power converter 25e can handle high-voltage power. Power converter 25e can convert low-voltage DC power of 1 kV to 3 kV into high-voltage DC power of 25 kV or more.

The effects of transformer 1e, 1f and power converter 25e of the present embodiment will be described. Transformer 1e, 1f and power converter 25e of the present embodiment achieve the following effects in addition to the effects of transformer 1d and power converter 25d of Embodiment 3.

Transformer 1e, 1f of the present embodiment further includes second primary coil 51, second secondary coil 52, second insulating member 55, third primary coil 61, third secondary coil 62, and third insulating member 65. Second primary coil 51 includes third conductor 56 wound around second leg 13b. Second secondary coil 52 includes fourth conductor 57 wound around second leg 13b. Second insulating member 55 covers second secondary coil 52. Third primary coil 61 includes fifth conductor 66 wound around fourth leg 14b. Third secondary coil 62 includes sixth conductor 67 wound around fourth leg 14b. Third insulating member 65 covers third secondary coil 62. Second secondary coil 52 is configured to be applied with a high voltage compared with second primary coil 51. Third secondary coil 62 is configured to be applied with a high voltage compared with third primary coil 61.

Fourth conductor 57 has the shape of the second polygon in the second cross-section of fourth conductor 57 perpendicular to the direction in which fourth conductor 57 extends. Second corner 57p of the second polygon has second radius of curvature $r_2$ of 0.1 mm or more. Sixth conductor 67 has the shape of the third polygon in the third cross-section of sixth conductor 67 perpendicular to the direction in which sixth conductor 67 extends. Third corner 67p of the third polygon has third radius of curvature $r_3$ of 0.1 mm or more.

Since second corner 57p has second radius of curvature $r_2$ of 0.1 mm and third corner 67p has third radius of curvature $r_3$ of 0.1 mm, an increase in the electric field strength, which results from the concentration of electric field at second corner 57p and third corner 67p, can be restrained, thus preventing a dielectric breakdown of second insulating member 55 and third insulating member 65. Thus, transformer 1e, 1f of the present embodiment has improved dielectric breakdown voltage. Gap $g_2$ between adjacent portions of fourth conductors 57 and gap $g_3$ between adjacent portions of sixth conductors 67 can be reduced, leading to miniaturization of second secondary coil 52 and third secondary coil 62. Thus, first core 13 and second core 14 can be miniaturized, reducing a power loss in first core 13 and second core 14. Transformer 1e, 1f of the present embodiment has improved power efficiency.

In transformer 1e, 1f of the present embodiment, first primary coil 11, first secondary coil 12, second primary coil 51, second secondary coil 52, third primary coil 61, and third secondary coil 62 can be disposed compactly in first core 13 and second core 14. According to transformer 1e, 1f of the present embodiment, a compact three-phase transformer can be obtained.

In transformer 1e, 1f of the present embodiment, fourth conductor 57 may be the second conductive foil, and sixth conductor 67 may be the third conductive foil. Thus, the power loss in second secondary coil 52 and third secondary coil 62, which results from the skin effect and the proximity effect in second secondary coil 52 and third secondary coil 62, can be reduced. Transformer 1e, 1f of the present embodiment can have improved power efficiency.

In transformer 1e of the present embodiment, second secondary coil 52 may be disposed inside second primary coil 51. Third secondary coil 62 may be disposed inside third primary coil 61. Gap $G_2$ between second primary coil 51 and second secondary coil 52 can thus be reduced relatively. Magnetic coupling between second primary coil 51 and second secondary coil 52 can be increased. Gap $G_3$ between third primary coil 61 and third secondary coil 62 can be reduced relatively. Magnetic coupling between third primary coil 61 and third secondary coil 62 can be increased. Transformer 1e having a relatively low leakage inductance can be provided.

In transformer 1f of the present embodiment, second primary coil 51 and second secondary coil 52 may be arranged in the direction in which second leg 13b extends. Third primary coil 61 and third secondary coil 62 may be arranged in the direction in which fourth leg 14b extends. Thus, gap $G_2$ between second primary coil 51 and second secondary coil 52 can be increased relatively. Magnetic coupling between second primary coil 51 and second secondary coil 52 can be weakened. Gap $G_3$ between third primary coil 61 and third secondary coil 62 can be increased relatively. Magnetic coupling between third primary coil 61 and third secondary coil 62 can be weakened. Transformer 1f having a relatively high leakage inductance can be provided.

Power converter 25e of the present embodiment includes DC/DC converters 30e. DC/DC converters 30e can each include primary terminals 31a, 31b, DC/AC conversion circuit 33d connected to primary terminals 31a, 31b, transformer 1e, 1f, AC/DC conversion circuit 34d, and secondary terminals 32a, 32b connected to AC/DC conversion circuit 34d. DC/AC conversion circuit 33d is connected to first primary coil 11, second primary coil 51, and third primary coil 61 and is a first three-phase bridge circuit. AC/DC conversion circuit 34d is connected to first secondary coil 12, second secondary coil 52, and third secondary coil 62 and is a second three-phase bridge circuit. Primary terminals 31a, 31b of DC/DC converters 30e are connected in parallel with each other. Secondary terminals 32a, 32b of DC/DC converters 30e are connected in series with each other. Power converter 25e of the present embodiment has improved dielectric breakdown voltage and improved power efficiency.

Embodiment 5

A transformer 1g according to Embodiment 5 will be described with reference to FIGS. 20 to 22. Although transformer 1g of the present embodiment includes components similar to the components of transformer 1e of Embodiment 4, it differs from that of Embodiment 4 mainly in the following respects.

Figure 20:
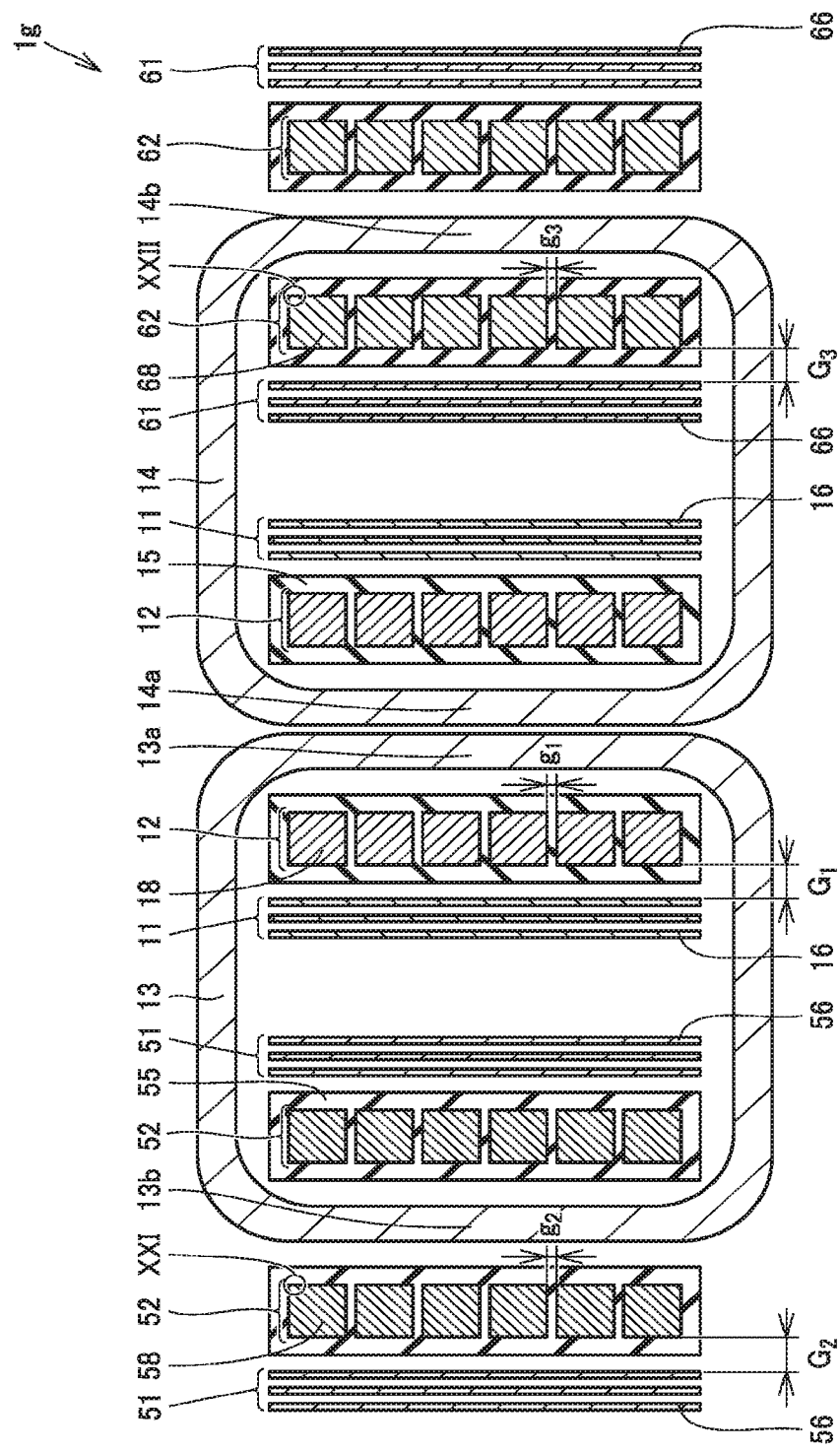
FIG. 20 is a schematic sectional view of the transformer according to Embodiment 5.
Figure 21:
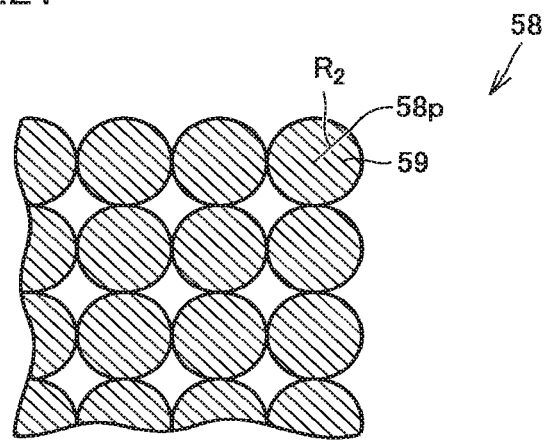
FIG. 21 is a partially enlarged schematic sectional view of a region XXI, shown in FIG. 20, of the transformer according to Embodiment 5.

As shown in FIGS. 20 and 21, in transformer 1g of the present embodiment, a fourth conductor 58 is a second litz wire formed of a plurality of twisted second conductive strands 59. Second conductive strands 59 each have the shape of a circle having a second radius $R_2$ of 0.1 mm or more in the second cross-section. Thus, fourth conductor 58 has a second corner 58p having second radius of curvature $r_2$ which is defined by second radius $R_2$ of second conductive strand 59. An increase in the electric field strength which results from the concentration of electric field at second corner 58p can be restrained, which can prevent a dielectric breakdown of second insulating member 55. Second radius $R_2$ may be equal to first radius $R_1$, may be greater than first radius $R_1$, or may be smaller than first radius $R_1$.

Figure 22:
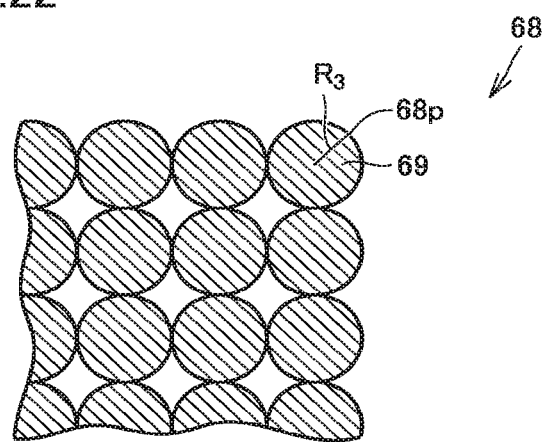
FIG. 22 is a partially enlarged schematic sectional view of a region XXII, shown in FIG. 20, of the transformer according to Embodiment 5.

As shown in FIGS. 20 and 22, in a transformer 1g of the present embodiment, a sixth conductor 68 is a third litz wire formed of a plurality of twisted third conductive strands 69. Third conductive strands 69 each have the shape of a circle having a third radius $R_3$ of 0.1 mm or more in the third cross-section. Thus, sixth conductor 68 has a third corner 68p having third radius of curvature $r_3$ which is defined by third radius $R_3$ of third conductive strand 69. An increase in electric field strength, which results from the concentration of electric field at third corner 68p, can be reduced, thus preventing a dielectric breakdown of third insulating member 65. Third radius $R_3$ may be equal to first radius $R_1$, may be greater than first radius $R_1$, or may be smaller than first radius $R_1$. Third radius $R_3$ may be equal to second radius $R_2$, may be greater than second radius $R_2$, or may be smaller than second $R_2$.

There is no need to process fourth conductor 58 and sixth conductor 68 in the present embodiment, unlike in Embodiment 4. Transformer 1g of the present embodiment can thus be manufactured at low cost compared with transformer 1e of Embodiment 4.

Figure 23:
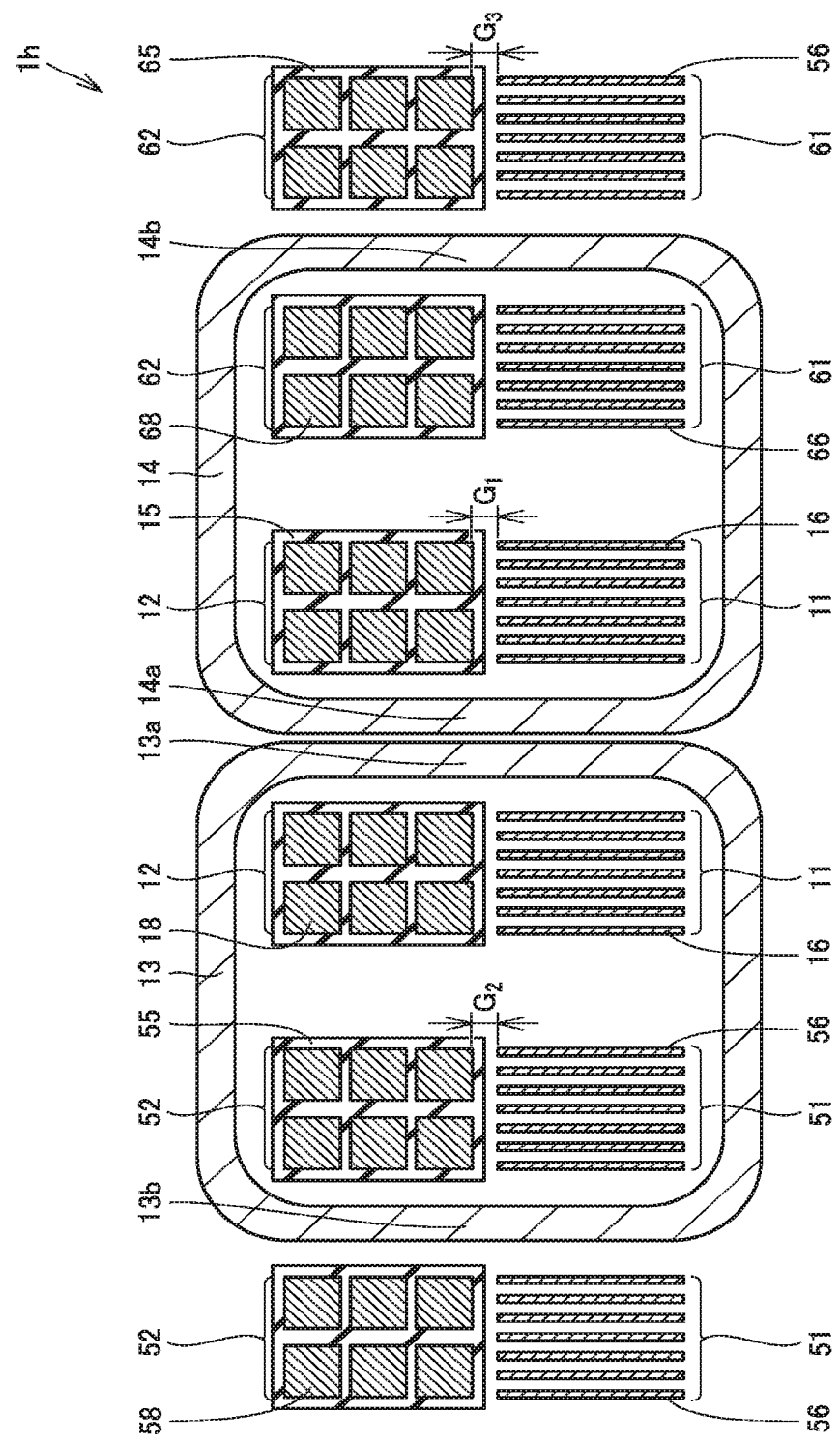
FIG. 23 is a schematic sectional view of a transformer according to a modification of Embodiment 5.

As shown in FIG. 23, in a transformer 1h of a modification of the present embodiment, second primary coil 51 and second secondary coil 52 may be arranged in the direction in which second leg 13b extends. In transformer 1h, gap $G_2$ between second primary coil 51 and second secondary coil 52 can be relatively large compared with transformer 1g. In transformer 1h, magnetic coupling between second primary coil 51 and second secondary coil 52 can be weak compared with transformer 1g. In transformer 1h, third primary coil 61 and third secondary coil 62 may be arranged in the direction in which fourth leg 14b extends. In transformer 1h, gap $G_3$ between third primary coil 61 and third secondary coil 62 can be relatively large compared with transformer 1g. In transformer 1h, magnetic coupling between third primary coil 61 and third secondary coil 62 can be weak compared with transformer 1g. Transformer 1h thus has a relatively high leakage inductance compared with transformer 1g.

A power converter 25g according to Embodiment 5 will be described with reference to FIGS. 12, 13, and 19. Although power converter 25g of the present embodiment includes components similar to the components of power converter 25e of Embodiment 4, it differs from that of Embodiment 4 in that transformer 1e, 1f of Embodiment 4 is replaced by transformer 1g or transformer 1h of the present embodiment. Specifically, power converter 25g of the present embodiment includes a plurality of DC/DC converters 30g. Although DC/DC converter 30g includes components similar to the components of DC/DC converters 30e of Embodiment 4, it differs from that of Embodiment 4 mainly in that transformer 1e, 1f of Embodiment 4 is replaced by transformer 1g or transformer 1h of the present embodiment.

The effects of transformer 1g, 1h and power converter 25g of the present embodiment will be described. Transformer 1g, 1h and power converter 25g of the present embodiment achieve the following effects similar to the components of transformer 1e and power converter 25e of Embodiment 4.

In transformer 1g, 1h and power converter 25g of the present embodiment, fourth conductor 58 may be a second litz wire formed of a plurality of twisted second conductive strands 59. Sixth conductor 68 may be a third litz wire formed of a plurality of twisted third conductive strands 69. Second conductive strands 59 may each have the shape of a circle having second radius $R_2$ of 0.1 mm or more in the second cross-section of fourth conductor 58. Third conductive strands 69 may each have the shape of a circle having third radius $R_3$ of 0.1 mm or more in the third cross-section of sixth conductor 68. Thus, an increase in electric field strength, which results from the concentration of electric field at second corner 58p and third corner 68p, can be restrained, thus preventing a dielectric breakdown of third insulating member 65. Transformer 1g, 1h and power converter 25g of the present embodiment have improved dielectric breakdown voltage and improved power efficiency.

Embodiment 6

A transformer 1i according to Embodiment 6 will be described with reference to FIGS. 1 and 2. Although transformer 1i of the present embodiment includes components similar to the components of transformer 1 of Embodiment 1, it differs from that of Embodiment 1 mainly in the following respects.

In transformer 1i of the present embodiment, a first inductance of first primary coil 11 is equal to a second inductance of first secondary coil 12. The first inductance of first primary coil 11 is measured by opening all the coils (including first secondary coil 12) except for first primary coil 11 and directly connecting a measuring instrument, such as an LCR meter, to the opposite ends (see the white circles of first primary coil 11 in FIG. 7) of first primary coil 11. The second inductance of first secondary coil 12 is measured by opening all the coils (including first primary coil 11) except for first secondary coil 12 and directly connecting a measuring instrument, such as an LCR meter, to the opposite ends (see the white circles of first secondary coil 12 in FIG. 7) of first secondary coil 12.

Generally, the inductance of a coil depends on the length of the coil, the shape of the coil, the distance between a core and the coil, and the like. For example, the inductance of the coil decreases as the length of the coil along the core decreases. The inductance of the coil decreases as the distance between the coil and the core increases. In the present embodiment, the length of first primary coil 11 along first leg 13a of first core 13 and third leg 14a of second core 14 is larger than the length of first secondary coil 12 along first leg 13a and third leg 14a. The distance between first leg 13a, third leg 14a and first primary coil 11 is larger than the distance between first leg 13a, third leg 14a and first secondary coil 12. As described above, in the present embodiment, the first inductance of first primary coil 11 can be made equal to the second inductance of first secondary coil 12.

As shown in FIG. 7, when a voltage is applied to between primary terminals 31a, 31b, the voltage is applied to first primary coil 11 via DC/AC conversion circuit 33. First primary coil 11 applied with the voltage excites a magnetic flux in first leg 13a of first core 13 and third leg 14a of second core 14. This magnetic flux causes an induced voltage in first secondary coil 12. Since the first inductance of first primary coil 11 is equal to the second inductance of first secondary coil 12, the same magnetic flux as that of first primary coil 11 is excited also in first secondary coil 12, causing the induced voltage to be equal to the voltage applied to first secondary coil 12 by second switching circuit 47. This prevents a flow of reactive current through second switching circuit 47, thus preventing a power loss in second switching elements 43a, 43b, 43c, 43d.

As shown in FIG. 7, when a voltage is applied to between secondary terminals 32a, 32b, the voltage is applied to first secondary coil 12 via AC/DC conversion circuit 34. First secondary coil 12 applied with the voltage excites a magnetic flux in first leg 13a of first core 13 and third leg 14a of second core 14. This magnetic flux causes an induced voltage in first primary coil 11. Since the first inductance of first primary coil 11 is equal to the second inductance of first secondary coil 12, the same magnetic flux as that of first secondary coil 12 is excited also in first primary coil 11, causing the induced voltage to be equal to the voltage applied to first primary coil 11 by first switching circuit 45. This prevents a flow of reactive current through first switching circuit 45, thus preventing a power loss in first switching elements 41a, 41b, 41c, 41d.

Transformer 1i of the present embodiment achieves the effect of having improved power efficiency in addition to the effects of transformer 1 of Embodiment 1. Although the first inductance of first primary coil 11 is made equal to the second inductance of first secondary coil 12 in transformer 1 of Embodiment 1 in the present embodiment, the first inductance of first primary coil 11 may be equal to the second inductance of first secondary coil 12 also in Embodiment 2 to Embodiment 5 and the modifications of Embodiment 1 to Embodiment 5. In Embodiment 4 and the modification thereof and Embodiment 5, the inductance of second primary coil 51 and the inductance of second secondary coil 52 may be equal to each other, and the inductance of third primary coil 61 and the inductance of third secondary coil 62 may be equal to each other.

It should be understood that Embodiments 1 to 6 and the modifications thereof disclosed herein are illustrative and non-restrictive in every respect. At least two of Embodiments 1 to 6 and the modifications thereof disclosed herein may be combined within a range free of inconsistency or contradiction. The scope of the present invention is defined by the terms of the claims, rather than the description of the embodiments above, and is intended to include any modifications within the scope and meaning equivalent to the terms of the claims.

REFERENCE SIGNS LIST

1, 1a, 1b, 1c, 1d, 1e, 1f, 1g, 1h, 1i transformer, 11 first primary coil, 12 first secondary coil, 13 first core, 13a first leg, 13b second leg, 14 second core, 14a third leg, 14b fourth leg, 15 first insulating member, 16 first conductor, 17, 18 second conductor, 17p, 18p first corner, 19 first conductive strand, 25, 25b, 25d, 25e, 25g power converter, 27a, 27b primary DC terminal, 28a, 28b secondary DC terminal, 30, 30d, 30e, 30g DC/DC converter, 31a, 31b primary terminal, 32a, 32b secondary terminal, 33, 33d DC/AC conversion circuit, 34, 34d AC/DC conversion circuit, 38 first capacitor, 39 second capacitor, 40 transformation unit, 41a, 41b, 41c, 41d, 41e, 41f first switching element, 42a, 42b, 42c, 42d, 42e, 42f first diode, 43a, 43b, 43c, 43d, 43e, 43f second switching element, 44a, 44b, 44c, 44d, 44e, 44f second diode, 45, 45d first switching circuit, 46a, 46b, 46c first leg, 47, 47d second switching circuit, 48a, 48b, 48c second leg, 51 second primary coil, 52 second secondary coil, 55 second insulating member, 56 third conductor, 57, 58 fourth conductor, 57p, 58p second corner, 59 second conductive strand, 61 third primary coil, 62 third secondary coil, 65 third insulating member, 66 fifth conductor, 67, 68 sixth conductor, 67p, 68p third corner, 69 third conductive strand.

The invention claimed is:

1. A power converter comprising:
a plurality of DC/DC converters;
a pair of primary DC terminals; and
a pair of secondary DC terminals, wherein
the plurality of DC/DC converters each include
a primary terminal,
a DC/AC conversion circuit connected to the primary terminal,
a transformer,
an AC/DC conversion circuit, and
a secondary terminal connected to the AC/DC conversion circuit,
the transformer includes
a first core,
a first primary coil, the first primary coil including a first conductor wound around the first core,
a first secondary coil, the first secondary coil including a second conductor wound around the first core, and
a first insulating member covering the first secondary coil,
the first secondary coil is applied with a high voltage compared with the first primary coil, and
the second conductor has a shape of a first polygon in a first cross-section of the second conductor perpendicular to a direction in which the second conductor extends, and a first corner of the first polygon has a first radius of curvature of 0.1 mm or more.

2. The power converter according to claim 1, wherein
the DC/AC conversion circuit is connected to the first primary coil and is a first single-phase bridge circuit,
the AC/DC conversion circuit is connected to the first secondary coil and is a second single-phase bridge circuit,
a plurality of the primary terminals of the plurality of DC/DC converters are connected in parallel with the pair of primary DC terminals, and
a plurality of the secondary terminals of the plurality of DC/DC converters are connected in series with each other and are connected in series between the pair of secondary DC terminals.

3. The power converter according to claim 2, wherein the second conductor comprises a first conductive foil.

4. The power converter according to claim 2, wherein
the second conductor comprises a first litz wire formed of a plurality of first conductive strands that are twisted, and
the plurality of first conductive strands each have a shape of a circle having a first radius of 0.1 mm or more in the first cross-section.

5. The power converter according to claim 2, wherein the first core is formed of a first amorphous magnetic material or a first nanocrystalline magnetic material.

6. The power converter according to claim 2, wherein a first inductance of the first primary coil is equal to a second inductance of the first secondary coil.

7. The power converter according to claim 2, further comprising a second core, wherein
the first core includes
a first leg, and
a second leg opposed to the first leg,
the second core includes
a third leg facing the first leg, and
a fourth leg opposed to the third leg,
the first conductor is wound around the first leg and the third leg, and
the second conductor is wound around the first leg and the third leg.

8. The power converter according to claim 7, wherein the first secondary coil is disposed inside the first primary coil.

9. The transformer power converter according to claim 7, wherein the first primary coil and the first secondary coil are arranged in a direction in which the first leg and the third leg extend.

10. The power converter according to claim 7, wherein the second core is formed of a second amorphous magnetic material or a second nanocrystalline magnetic material.

11. The power converter according to claim 1, wherein
the transformer further includes a second core,
the first core includes
- a first leg, and
- a second leg opposed to the first leg, the second core includes
- a third leg facing the first leg, and
- a fourth leg opposed to the third leg, the first conductor is wound around the first leg and the third leg,
the second conductor is wound around the first leg and the third leg,
the transformer further includes
- a second primary coil, the second primary coil including a third conductor wound around the second leg,
- a second secondary coil, the second secondary coil including a fourth conductor wound around the second leg,
- a second insulating member covering the second secondary coil,
- a third primary coil, the third primary coil including a fifth conductor wound around the fourth leg,
- a third secondary coil, the third secondary coil including a sixth conductor wound around the fourth leg, and
- a third insulating member covering the third secondary coil, the second secondary coil is applied with a high voltage compared with the second primary coil,
the third secondary coil is applied with a high voltage compared with the third primary coil,
the fourth conductor has a shape of a second polygon in a second cross-section of the fourth conductor perpendicular to a direction in which the fourth conductor extends, and a second corner of the second polygon has a radius of curvature of 0.1 mm or more,
the sixth conductor has a shape of a third polygon in a third cross-section of the sixth conductor perpendicular to a direction in which the sixth conductor extends, and a third corner of the third polygon has a third radius of curvature of 0.1 mm or more,
the DC/AC conversion circuit is connected to the first primary coil, the second primary coil, and the third primary coil and is a first three-phase bridge circuit,
the AC/DC conversion circuit is connected to the first secondary coil, the second secondary coil, and the third secondary coil and is a second three-phase bridge circuit,
a plurality of the primary terminals of the plurality of DC/DC converters are connected in parallel with the pair of primary DC terminals, and
a plurality of the secondary terminals of the plurality of DC/DC converters are connected in series with each other and are connected in series between the pair of secondary DC terminals.

12. The power converter according to claim 11, wherein
the fourth conductor comprises a second conductive foil, and
the sixth conductor comprises a third conductive foil.

13. The power converter according to claim 11, wherein
the fourth conductor comprises a second litz wire formed of a plurality of second conductive strands that are twisted,
the sixth conductor comprises a third litz wire formed of a plurality of third conductive strands that are twisted,
the plurality of second conductive strands each have a shape of a circle having a second radius of 0.1 mm or more in the second cross-section, and
the plurality of third conductive strands each have a shape of a circle having a third radius of 0.1 mm or more in the third cross-section.

14. The power converter according to claim 11, wherein
the second secondary coil is disposed inside the second primary coil, and
the third secondary coil is disposed inside the third primary coil.

15. The power converter according to claim 11, wherein
the second primary coil and the second secondary coil are arranged in a direction in which the second leg extends, and
the third primary coil and the third secondary coil are arranged in a direction in which the fourth leg extends.

16. The power converter according to claim 1, wherein
the plurality of DC/DC converters each including a transform unit including three of the transformers,
the DC/AC conversion circuit is connected to a plurality of the first primary coils of the three transformers and is a first three-phase bridge circuit,
the AC/DC conversion circuit is connected to a plurality of the first secondary coils of the three transformers and is a second three-phase bridge circuit,
a plurality of the primary terminals of the plurality of DC/DC converters are connected in parallel with each other, and
a plurality of the secondary terminals of the plurality of DC/DC converters are connected in series with each other.

* * * * *